United States Patent
Katou et al.

(10) Patent No.: US 7,032,560 B2
(45) Date of Patent: Apr. 25, 2006

(54) PARTITION PLATE FOR INTAKE PORT, SAND CORE FOR FORMING INTAKE PORT, AND CYLINDER HEAD

(75) Inventors: Hiroshi Katou, Tochigi-ken (JP); Hirohito Kajihara, Atsugi (JP); Kenji Yageta, Tochigi-ken (JP); Toshiyuki Nishida, Matsuzaka (JP); Masami Inose, Utsunomiya (JP); Tatsuya Masuta, Saitama (JP)

(73) Assignees: Nissan Motor Co., Ltd., Yokohama (JP); Aichi Machine Industry Co., Ltd., Nagoya (JP)

( * ) Notice: Subject to any disclaimer, the term of this patent is extended or adjusted under 35 U.S.C. 154(b) by 0 days.

(21) Appl. No.: 10/967,144

(22) Filed: Oct. 19, 2004

(65) Prior Publication Data

US 2005/0081821 A1 Apr. 21, 2005

(30) Foreign Application Priority Data

Oct. 20, 2003 (JP) .................................... 2003-359931
Oct. 20, 2003 (JP) .................................... 2003-359934
Oct. 20, 2003 (JP) .................................... 2003-359940

(51) Int. Cl.
*F02B 31/00* (2006.01)

(52) U.S. Cl. .................... 123/193.5; 123/306; 164/98
(58) Field of Classification Search .............. 123/193.5, 123/306; 164/98; 29/888.06
See application file for complete search history.

(56) References Cited

U.S. PATENT DOCUMENTS

| 5,632,244 A | 5/1997 | Endres et al. |
| 2002/0078921 A1 | 6/2002 | Kim et al. |

FOREIGN PATENT DOCUMENTS

| DE | 198 03 867 A1 | 8/1999 |
| EP | 1 336 750 A2 | 8/2003 |
| JP | 2001-193469 A | 7/2001 |

*Primary Examiner*—Noah P. Kamen
(74) *Attorney, Agent, or Firm*—Foley & Lardner LLP

(57) ABSTRACT

A partition plate for an intake port of a cylinder head to be manufactured by cast molding is preliminarily set prior to the cast molding in a sand core applied to form the intake port and then cast in by the cast molding to partition the intake port into a plurality of ports. The partition plate is provided with an intake-side distal end, a cylinder-side distal end, a pair of side edges continuous with the intake-side distal end and the cylinder-sided distal end and to be cast in by molten metal during the cast molding. Each of the pair of side edges having end faces facing in a thickness direction and a side end face continuous with the end faces. The partition plate is further provided with a promoter section provided on at least one of the side end face and the end faces of each of the pair of side edges to promote solidification of the molten metal.

23 Claims, 20 Drawing Sheets

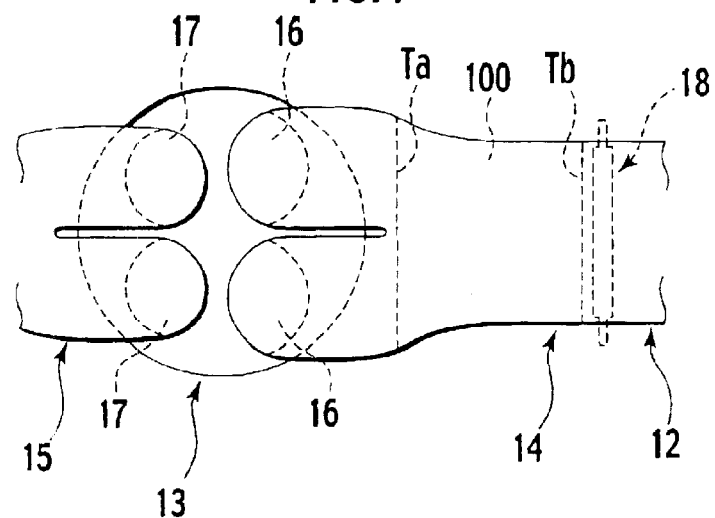
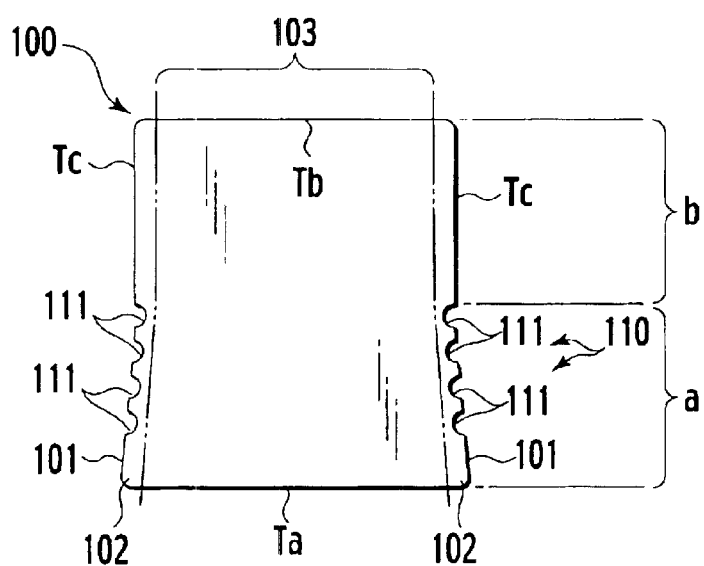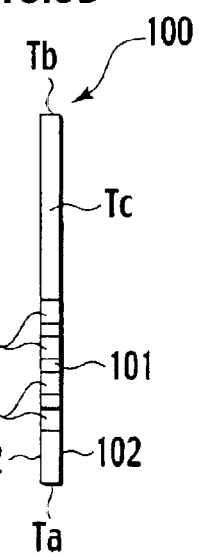

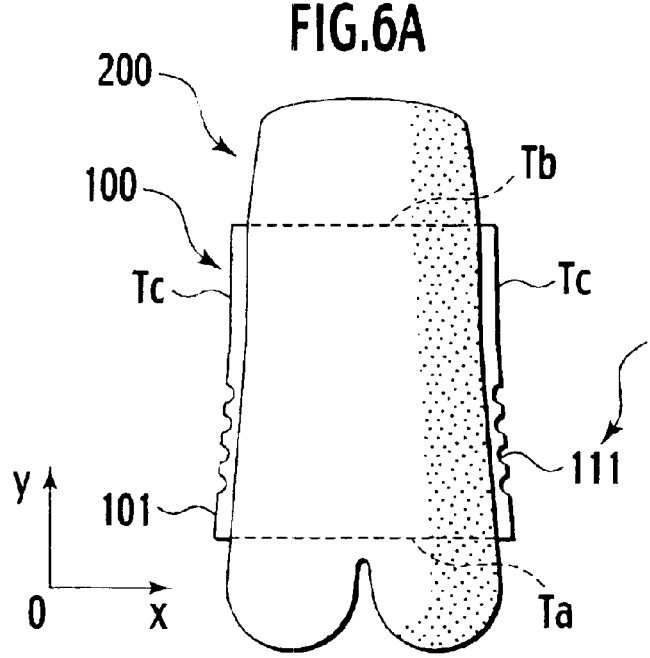
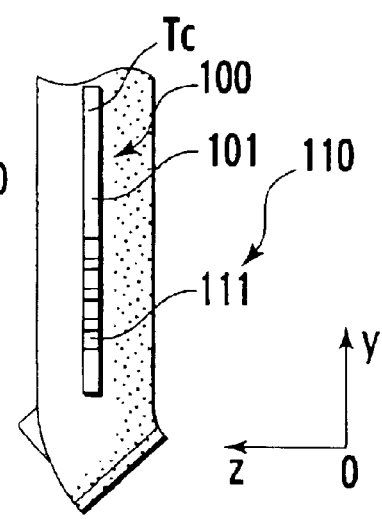
FIG.6A  FIG.6B
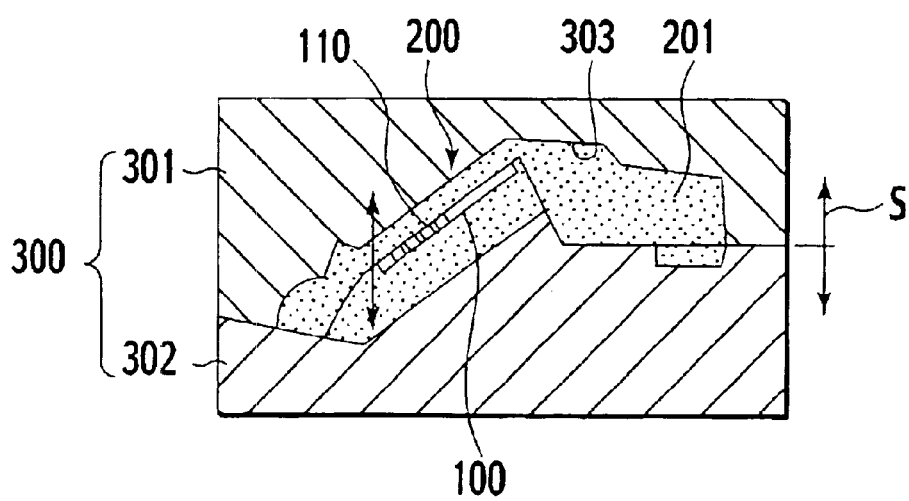
FIG.7

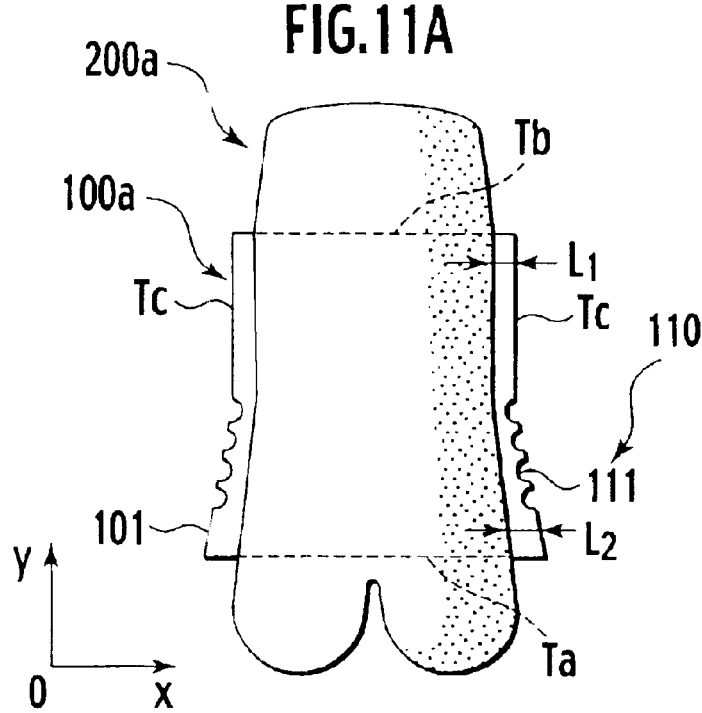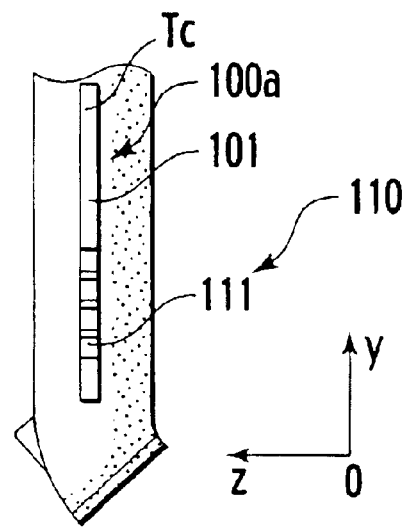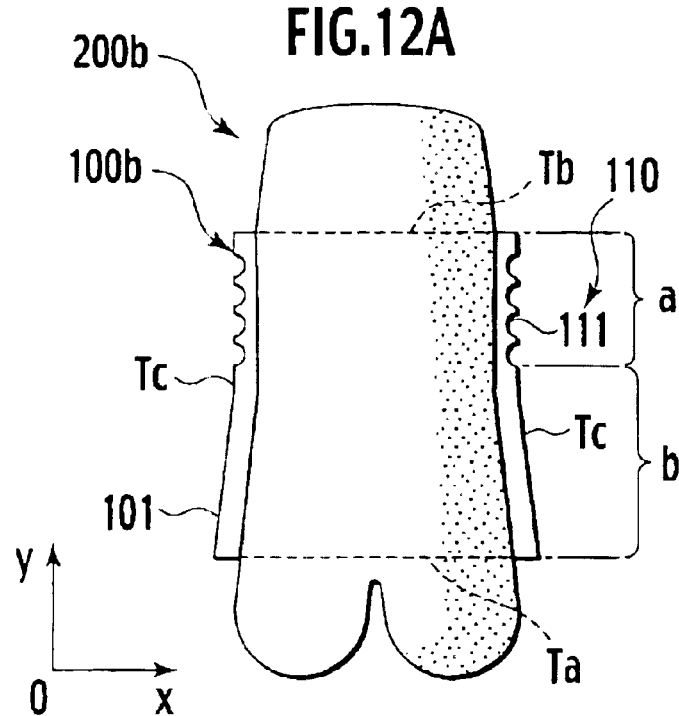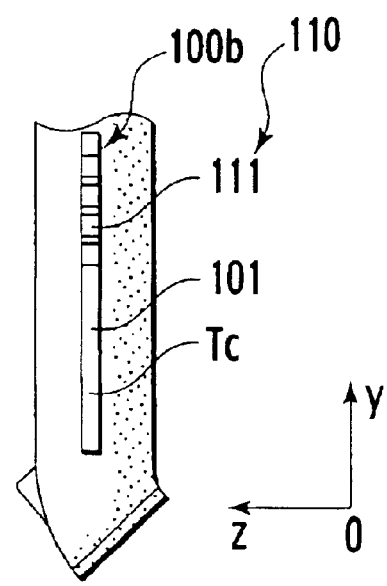

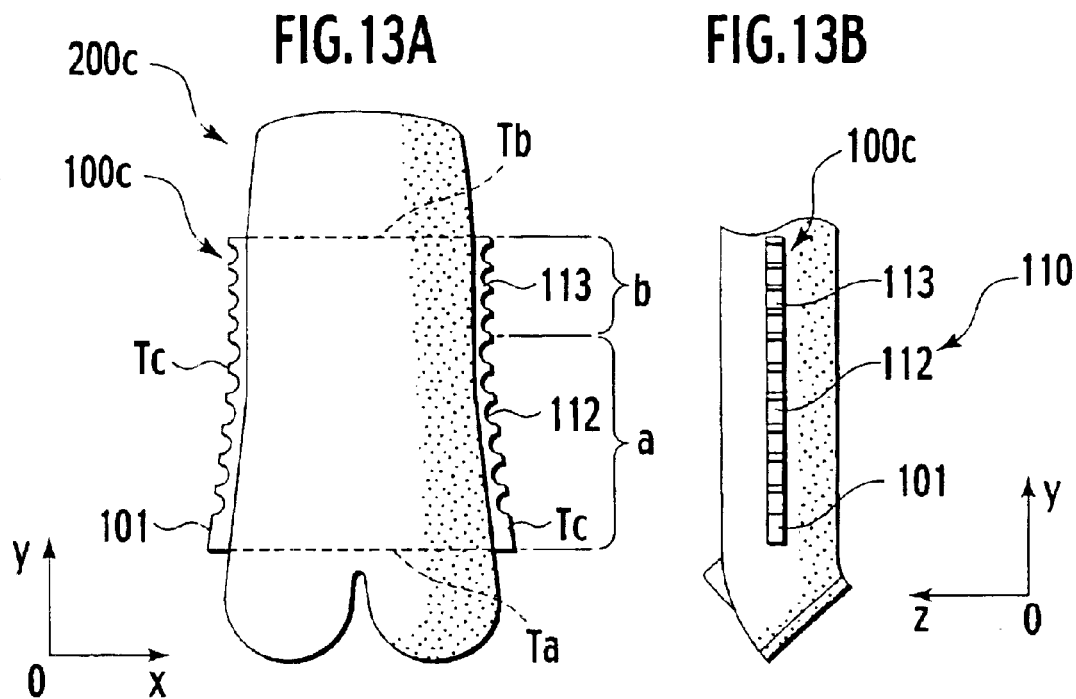
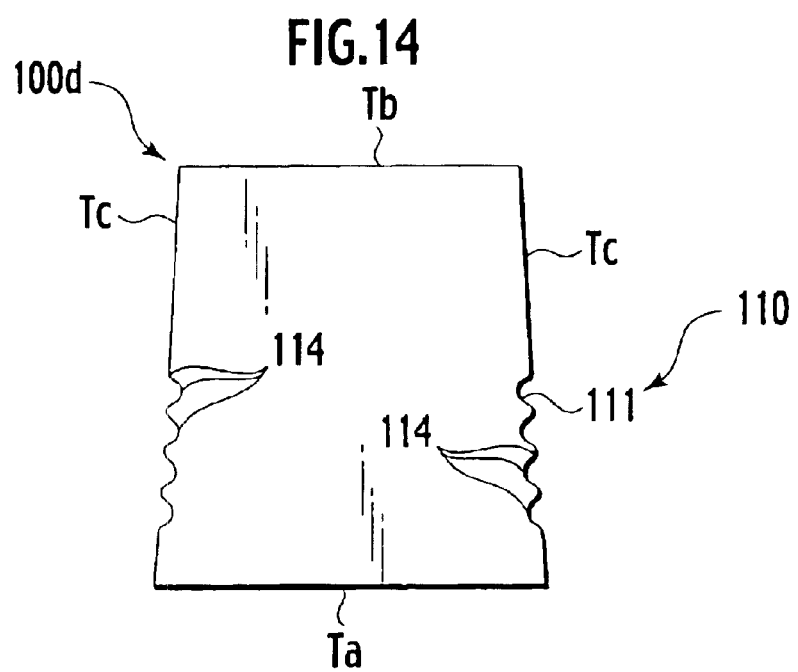

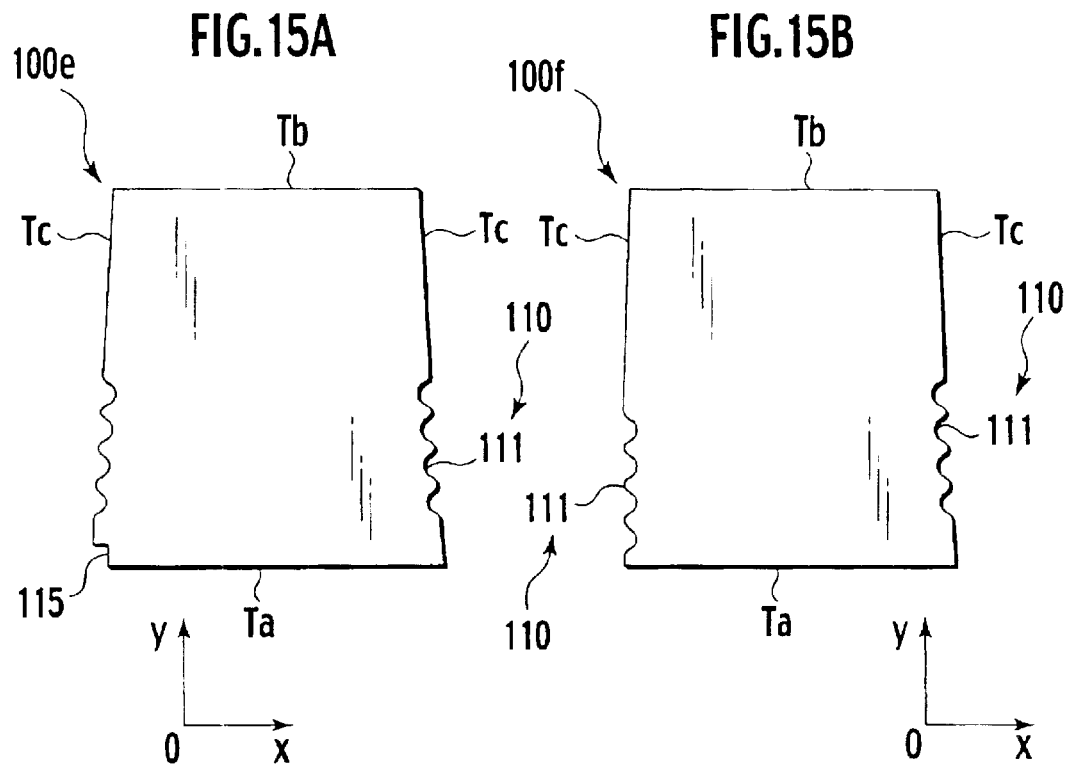
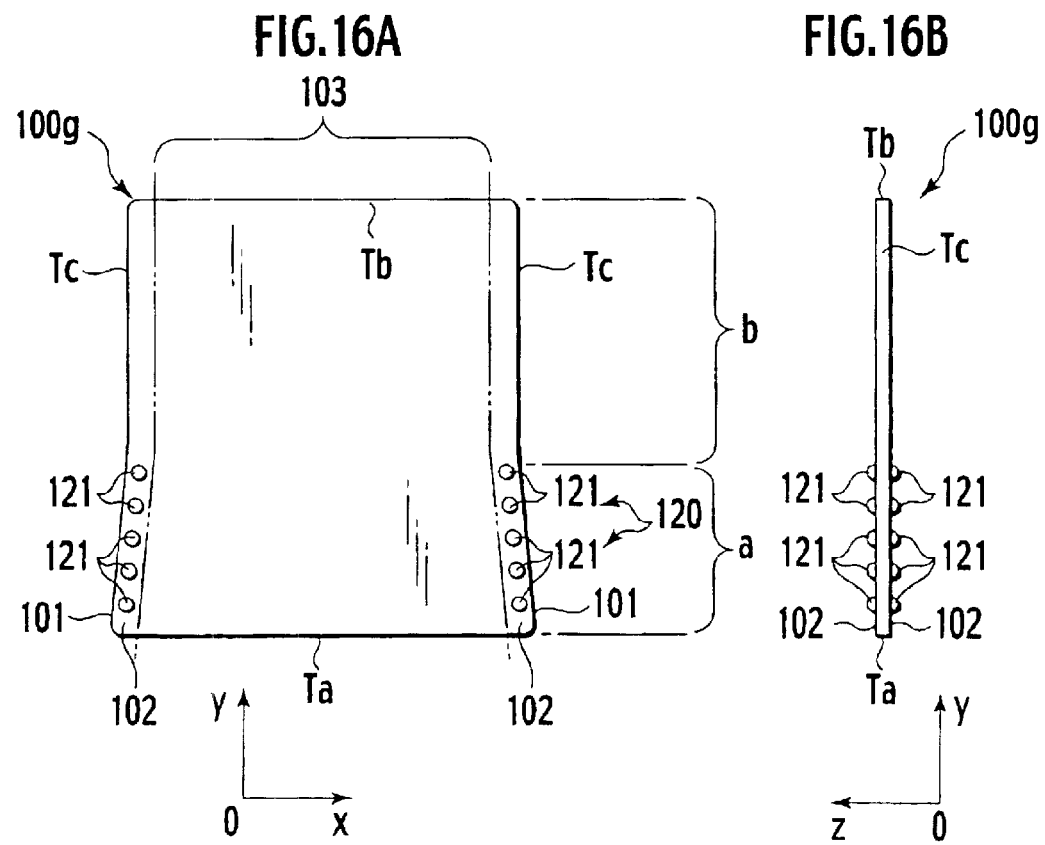

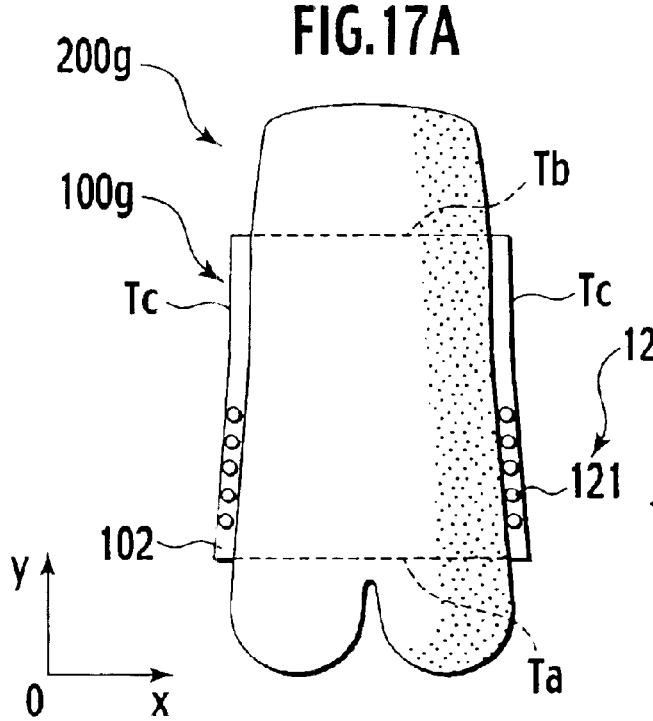
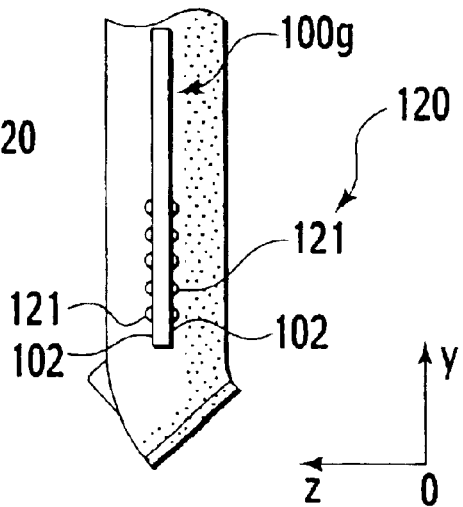
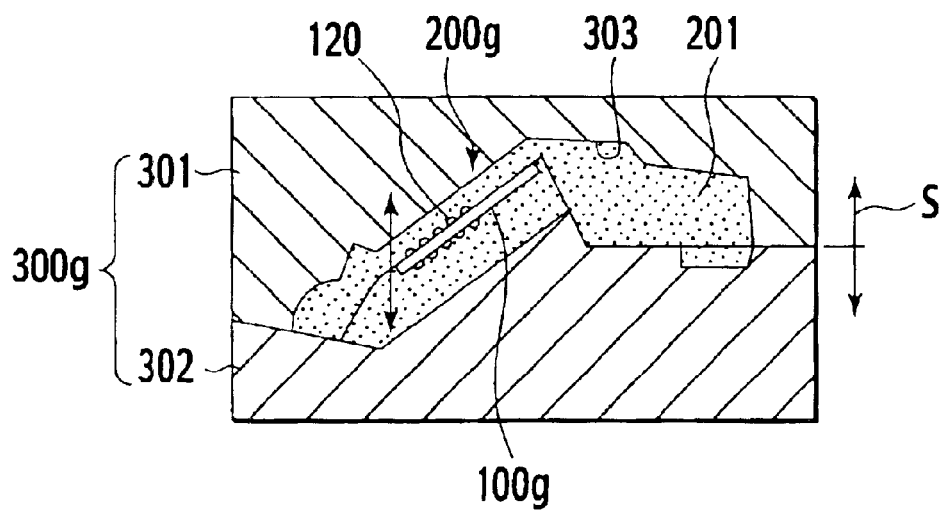

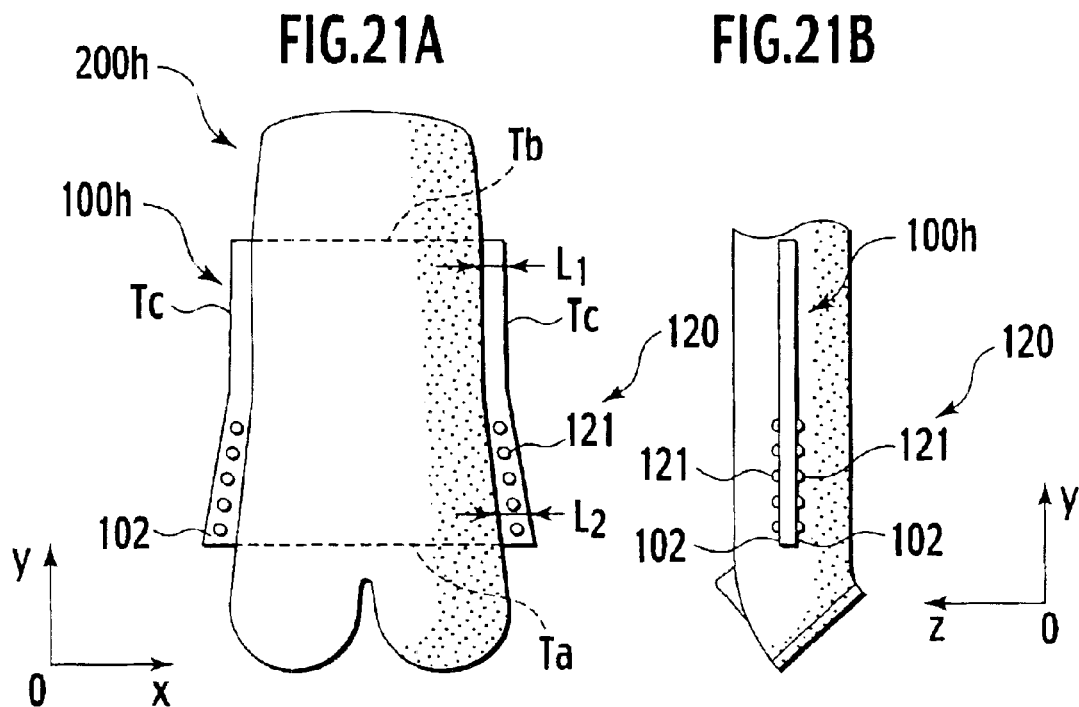
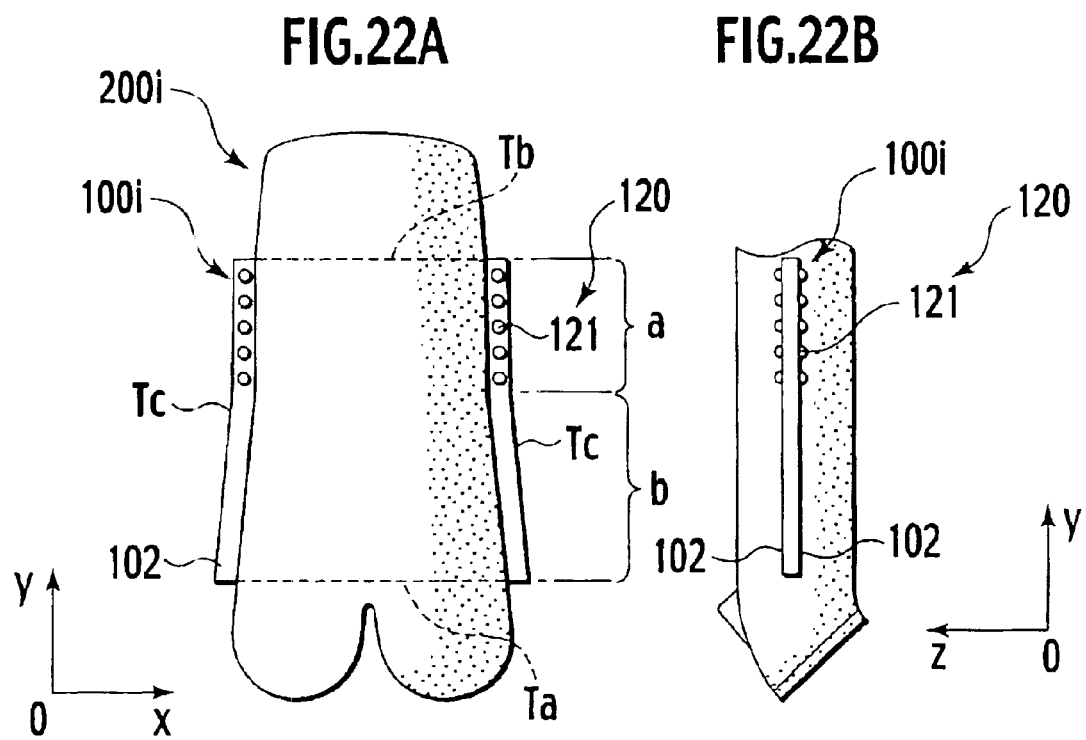

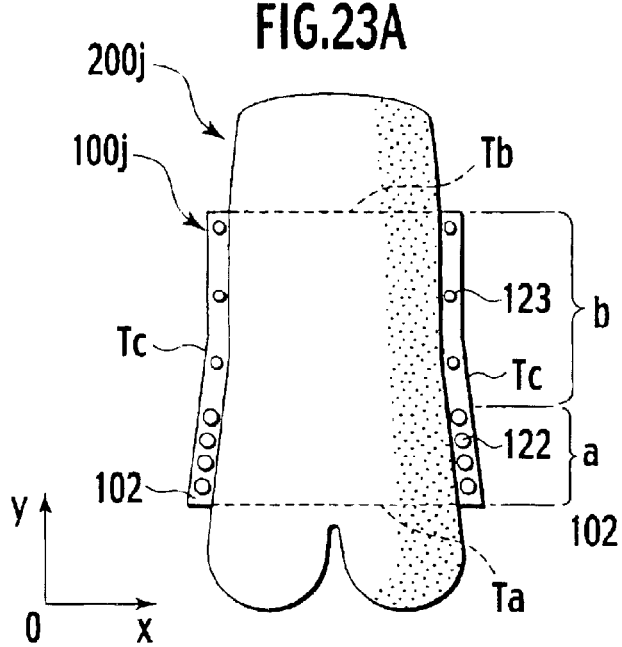
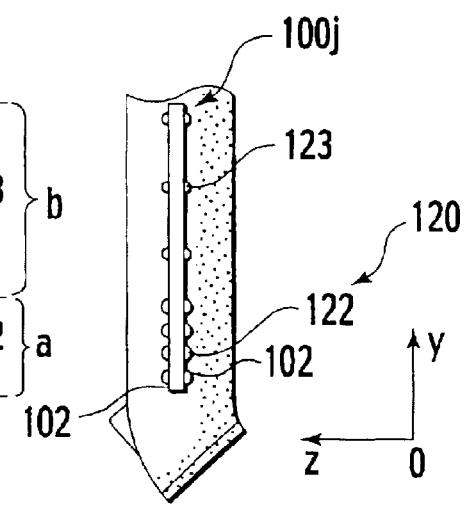
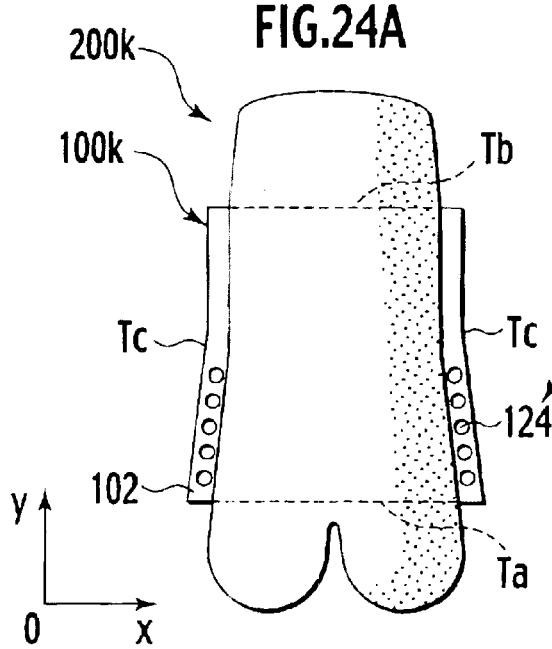
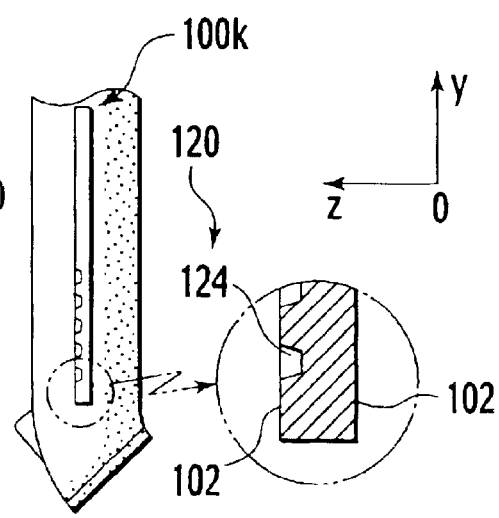

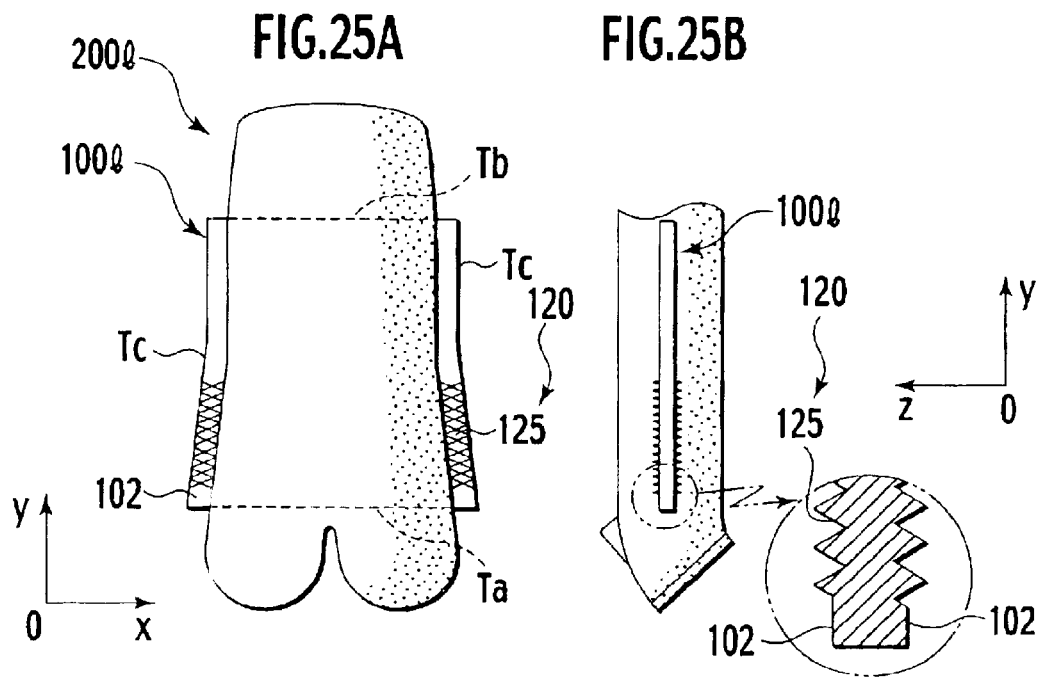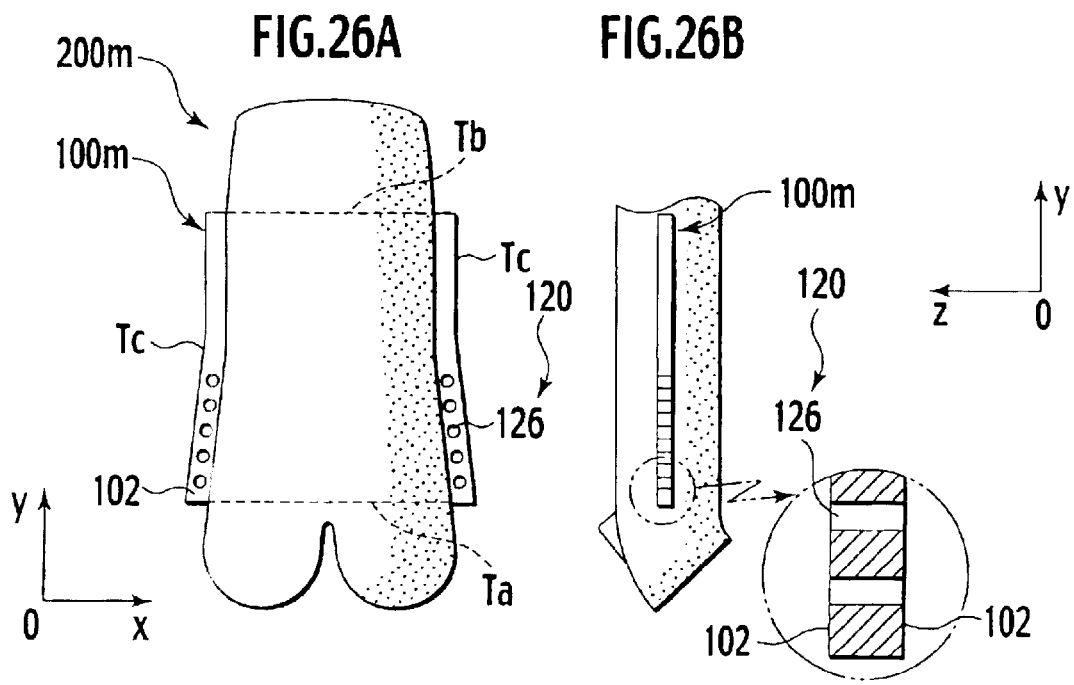

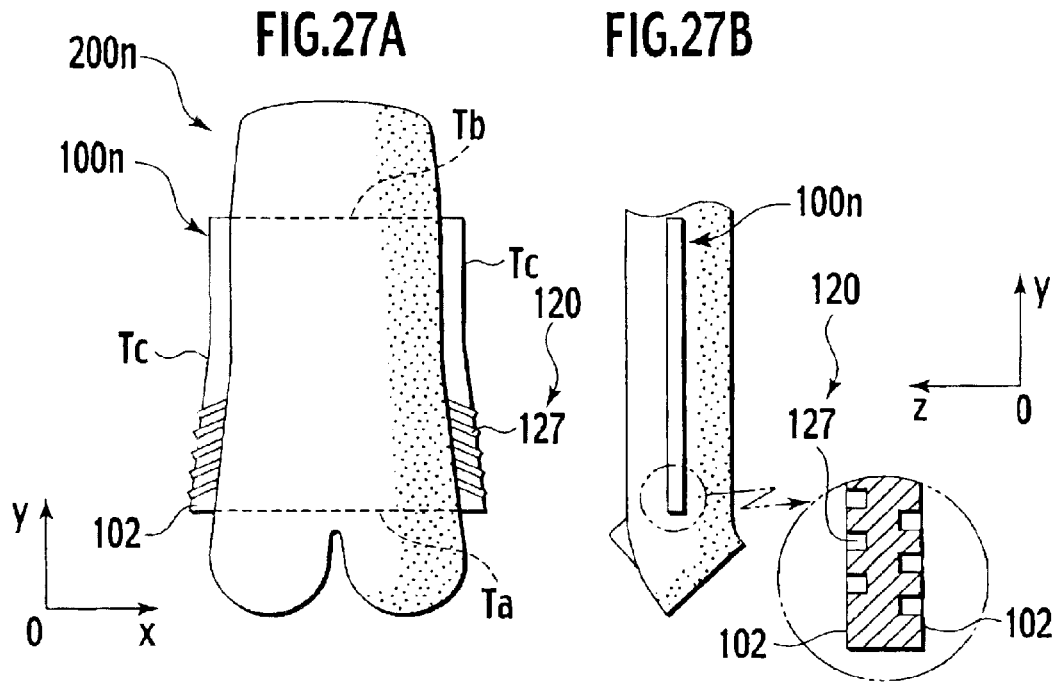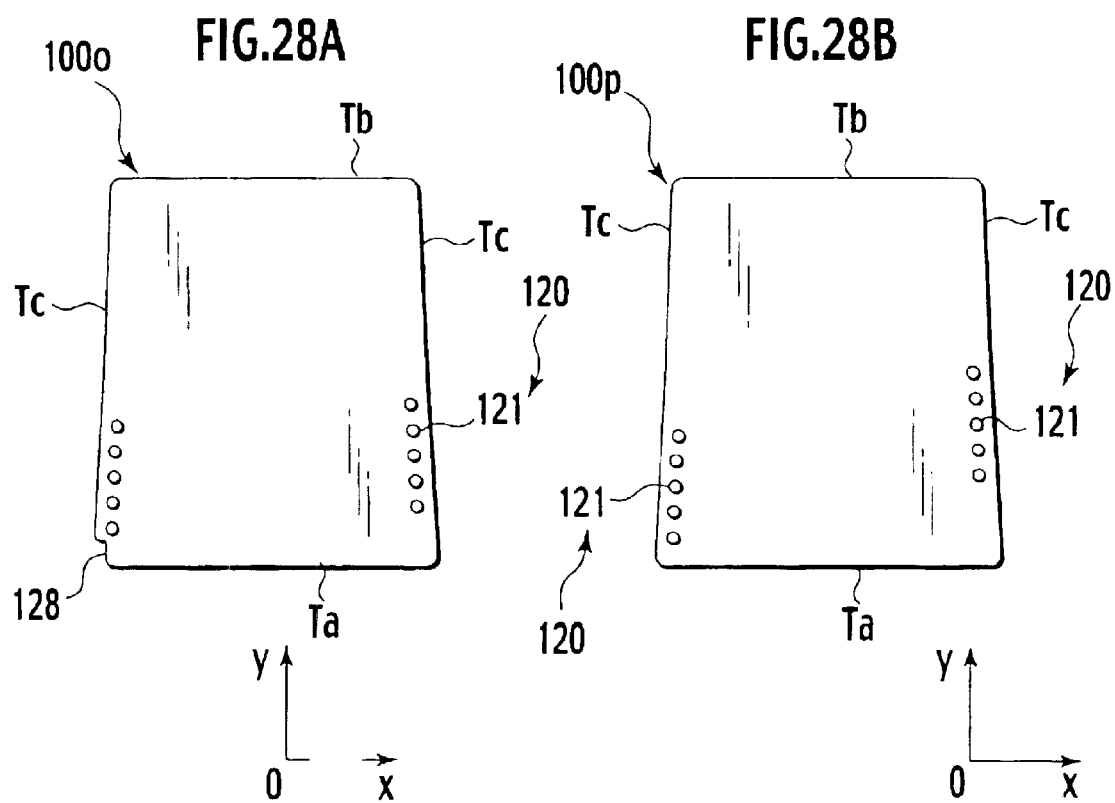

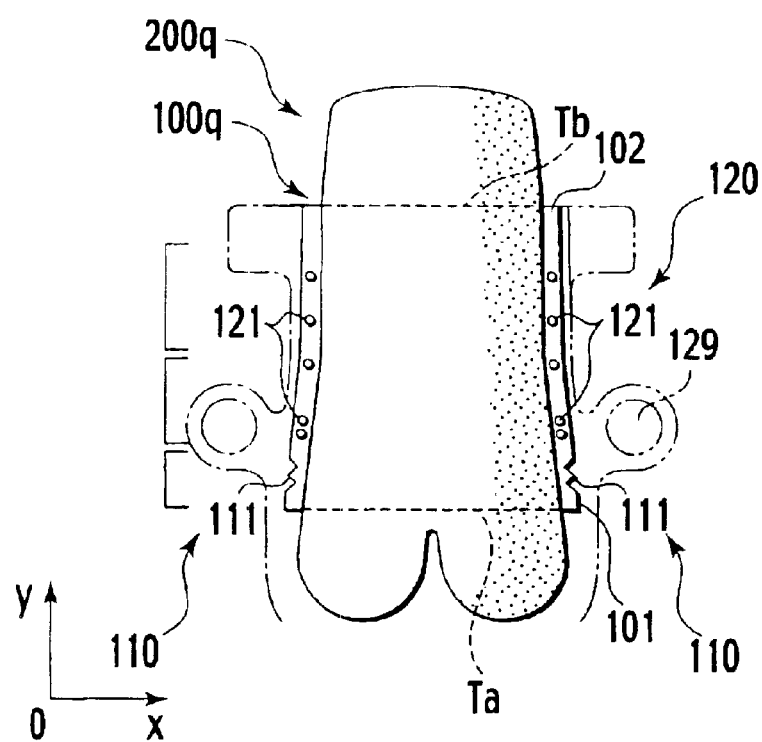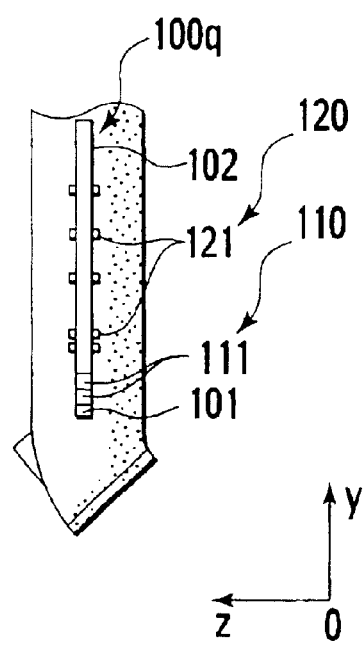

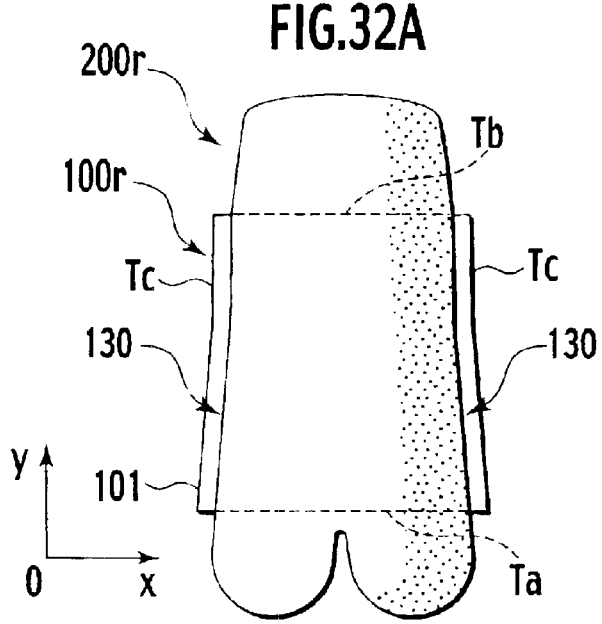
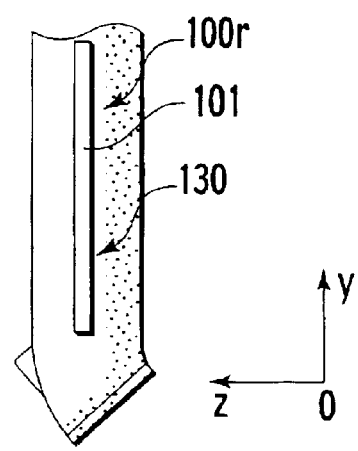
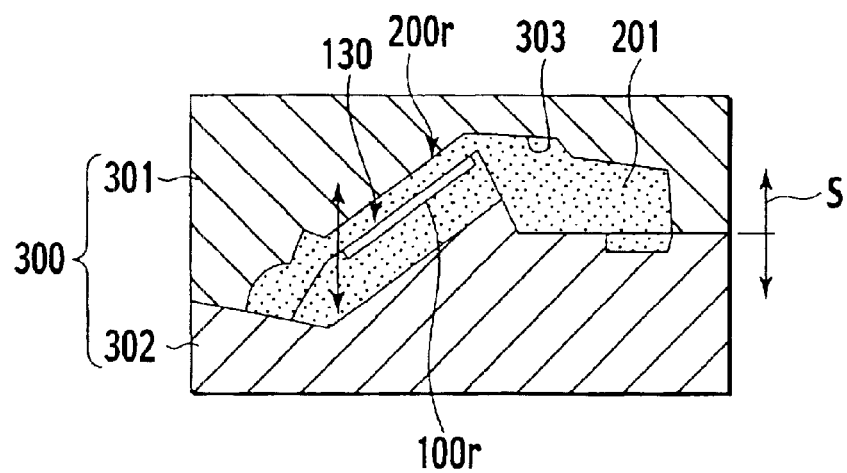

PARTITION PLATE FOR INTAKE PORT, SAND CORE FOR FORMING INTAKE PORT, AND CYLINDER HEAD

BACKGROUND OF THE INVENTION

The present invention relates to a partition plate for an intake port, a sand core for forming an intake-port and a cylinder head and, more particularly, to a partition plate for an intake port, a sand core for forming an intake-port and a cylinder head which are able to improve a precision in fixing position of a tumble plate in an intake port of a cylinder head.

In recent years, a cylinder of an internal combustion engine includes a cylinder head formed with an intake port in which a partition plate, called as a tumble plate, is set.

Japanese Patent Application Laid-Open Publication No. 2001-193469 (see paragraphs 0011, 0020 and 0022 and FIGS. 1, 3 and 4) discloses a structure wherein an airflow control valve disposed in an intake-side distal end of an intake port is controlled while permitting a partition plate to deflect intake air, introduced from the intake port to a cylinder bore, for intensifying a tumble flow occurring inside the cylinder bore thereby to achieve improvement in fuel consumption.

Incidentally, in the following description, for the partition plate, a side across which intake air, such as air and fuel gas, is passed is referred to as an "intake-side" and the opposite side, i.e., a cylinder bore side is referred to as a "cylinder-side". Further, the partition plate for the intake port is referred to as a "tumble plate".

SUMMARY OF THE INVENTION

However, upon studies conducted by the present inventors, for the cylinder head being cast molded, it is conceivable for a metallic partition plate to be set in an intake-port forming sand core to allow the partition plate to be cast in for cast molding. On the cast molding of the cylinder head, the sand core and the partition plate are exposed to heat of molten metal to result in increases in respective temperatures to cause thermal expansions.

Here, a large difference exists between a coefficient of thermal expansion of the partition plate and a coefficient of thermal expansion of the core by which the partition plate is retained, and it is conceivable that the partition plate has the amount of thermal expansion greater than that of the core.

Thus, it is conceivable for the partition plate to pressurize or expand the core, causing cracks or damages to the core, whereby molten metal exudes through the cracks with resultant formation of burrs. Also, it is conceivable that due to thermal expansion of the partition plate, a locating position of the partition plate is adversely affected on the cast molding of the cylinder head and, additionally, there exists a probability for looseness of the partition plate to occur in the cylinder head, serving as a cast product, after completing the cast molding.

For this reason, it is conceived that not only exceptionally troublesome deburring work is required in subsequent processing depending upon regions at which the burrs occur, but also deterioration occurs in a product quality as a result of positional displacement of the partition plate or the occurrence of looseness inside the cast product. This results in conclusion in that sufficient consideration needs to be undertaken for the partition plate in respect of thermal affects.

Here, the partition plate, disclosed in Japanese Patent Application Laid-Open Publication No. 2001-193469, is formed in a wave shape as measure to count the occurrence of deformation in the partition plate caused by thermal expansion, that would occur when the partition plate is cast in by molten metal, in cast molding the cylinder head. However, even though the partition plate with the wave shape is effective to absorb thermal expansion in a radial direction of the intake port, it cannot be said that such a partition plate has a capability to adequately absorb thermal expansion in an axial direction.

For this reason, it is hard to say that such a structure is able to reliably eliminate the occurrence of the burrs resulting from cracks in the core due to a difference in the amount of thermal expansion between the partition plate and the core and, further, it can be evaluated that such a structure is unable to sufficiently eliminate positional displacement of the partition plate or looseness of the same in the cast product.

Further, it is conceivable for the cylinder head after the cast molding to take a structure where both side edges of the partition plate are not fused to the cylinder head. With the side edges fused, due to thermal shocks and vibrations in repeated cycles in the engine, it is conceivable for the partition plate to be adversely affected.

However, if cast-in portions, i.e., the both side edges, of the partition plate are not fused to the cylinder head, it is conceivable that for the cylinder head as the cast product after completing the cast molding, looseness of the partition plate occurs in the cast product.

Furthermore, from the viewpoint of manufacturing costs, it is probable for pressed products to be used as the partition plates. The pressed products generally employ plate materials that have a relatively small surface roughness in order to properly perform press forming and, in addition to this, surfaces contaminated with lubricating films on press forming operations. With the partition plate, formed of such a press product, cast in and molded, a gripping force of the partition plate with respect to the cylinder head becomes low and looseness of the partition plate is apt to occur in the cast product.

The present invention has been completed upon such studies conducted by the present inventors and has an object to provide a partition plate for an intake port, a sand core for forming an intake-port and a cylinder head which are able to adequately eliminate positional displacement of the partition plate and looseness of the same in a cast product to achieve improvement in a product and additionally effectuate burrs, resulting from cracks of a core, to occur in limited regions to provide an ease of deburring work on subsequent processing.

To achieve the above object, in one aspect of the present invention, there is provided a partition plate, for an intake port of a cylinder head to be manufactured by cast molding, which is preliminarily set prior to the cast molding in a sand core applied to form the intake port and then cast in when the cast molding is conducted so as to partition the intake port into a plurality of ports, comprising: an intake-side distal end; a cylinder-side distal end; a pair of side edges continuous with the intake-side distal end and the cylinder-sided distal end and to be cast in by molten metal when cast molding is conducted, each of the pair of side edges having end faces facing in a thickness direction and a side end face continuous with the end faces; and a promoter section provided on at least one of the side end face and the end faces of each of the pair of side edges to promote solidification of the molten metal.

In another aspect of the present invention, there is provided a cylinder head adapted to be manufactured by cast molding, comprising: a cylinder bore; an intake port connected to the cylinder bore; and a partition plate that is preliminarily set, prior to cast molding, in a sand core applied to form the intake port and then cast in when the cast molding is conducted so as to partition the intake port into a plurality of ports, the partition plate being provided with: an intake-side distal end; a cylinder-side distal end; a pair of side edges continuous with the intake-side distal end and the cylinder-sided distal end and to be cast in by molten metal when cast molding is conducted, each of the pair of side edges having end faces facing in a thickness direction and a side end face continuous with the end faces; and a promoter section provided on at least one of the side end face and the end faces of each of the pair of side edges to promote solidification of the molten metal.

In another aspect of the present invention, there is provided a method of manufacturing a cylinder head having a partition plate for an intake port, comprising: preparing a partition plate including an intake-side distal end, a cylinder-side distal end, a pair of side edges continuous with the intake-side distal end and the cylinder-sided distal end to be cast in by molten metal when cast molding is conducted, and a promoter section provided on at least one of end faces, facing in a thickness direction, and a side end face, continuous with the end faces, of each of the pair of side edges to promote solidification of the molten metal; setting the partition plate in a sand core applied to form an intake port such that each of the pair of side edges is exposed outside; supplying molten metal onto each of the pair of side edges of the partition plate; solidifying the molten metal while promoting the solidification of the molten metal with the promoter section; and removing the sand core.

In another aspect of the present invention, there is provided a partition plate, for an intake port of a cylinder head adapted to be manufactured by cast molding, which is preliminarily set, prior to the cast molding, in a sand core applied to form the intake port and then cast in when the cast molding is conducted so as to partition the intake port into a plurality of ports, comprising: an intake-side distal end; a cylinder-side distal end; a pair of side edges continuous with the intake-side distal end and the cylinder-sided distal end and to be cast in by molten metal when cast molding is conducted; and a surface treated section, provided on each of the pair of side edges, which is subjected to surface treatment in a coarse surface to have a coarser surface roughness than a surface roughness of a partitioning section by which an intake port is partitioned.

In another aspect of the present invention, there is provided a cylinder head adapted to be manufactured by cast molding, comprising: a cylinder bore; an intake port connected to the cylinder bore; and a partition plate that is preliminarily set, prior to cast molding, in a sand core applied to form the intake port and then cast in when the cast molding is conducted so as to partition the intake port into a plurality of ports, the partition plate being provided with: an intake-side distal end; a cylinder-side distal end; a pair of side edges continuous with the intake-side distal end and the cylinder-sided distal end and to be cast in by molten metal when cast molding is conducted; and a surface treated section, provided on each of the pair of side edges, which is subjected to surface treatment in a coarse surface to have a coarser surface roughness than a surface roughness of a partitioning section by which the intake port is partitioned.

In another aspect of the present invention, there is provided a method of manufacturing a cylinder head having a partition plate for an intake port, comprising: preparing a partition plate including an intake-side distal end, a cylinder-side distal end, a pair of side edges continuous with the intake-side distal end and the cylinder-sided distal end and to be cast in by molten metal when cast molding is conducted, and a surface treated section provided on each of the pair of side edges and subjected to surface treatment in a coarse surface to have a coarser surface roughness than a surface roughness of a partitioning section by which an intake port is partitioned; setting the partition plate in a sand core to form the intake port such that each of the pair of side edges is exposed outside; supplying molten metal onto each of the pair of side edges of the partition plate; solidifying the molten metal while causing the surface treated section to be cast in; and removing the sand core.

BRIEF DESCRIPTION OF THE DRAWINGS

FIG. 4 is a schematic plan view of the cylinder head as viewed in a Z-direction in FIG. 3;

FIG. 5A is a plan view illustrating a tumble plate of the presently filed embodiment;

FIG. 5B is a side view of the tumble plate shown in FIG. 5A;

FIG. 6A is a schematic plan view illustrating a port core in which the tumble plate of the presently filed embodiment is preliminarily set;

FIG. 6B is a schematic side view of the tumble plate shown in FIG. 6A;

FIG. 7 is a schematic cross sectional view illustrating a mold for molding the port core of the presently filed embodiment;

FIG. 11A is a schematic plan view illustrating a port core in which a tumble plate, of a second embodiment according to the present invention, is preliminarily set;

FIG. 11B is a schematic cross sectional view of the tumble plate shown in FIG. 11A;

FIG. 12A is a schematic plan view illustrating a port core in which a tumble plate, of a third embodiment according to the present invention, is preliminarily set;

FIG. 12B is a schematic cross sectional view of the tumble plate shown in FIG. 12A;

FIG. 13A is a schematic plan view illustrating a port core in which a tumble plate, of a fourth embodiment according to the present invention, is preliminarily set;

FIG. 13B is a schematic cross sectional view of the tumble plate shown in FIG. 13A;

FIG. 14 is a plan view illustrating a tumble plate of a fifth embodiment according to the present invention;

FIG. 15A is a plan view illustrating a tumble plate of a sixth embodiment according to the present invention;

FIG. 15B is a plan view illustrating a tumble plate of another example of the presently filed embodiment;

FIG. 16A is a plan view illustrating a tumble plate of a seventh embodiment according to the present invention;

FIG. 16B is a side view of the tumble plate shown in FIG. 16A;

FIG. 17A is a schematic plan view illustrating a port core in which the tumble plate of the presently filed embodiment is preliminarily set;

FIG. 17B is a schematic side view of the tumble plate shown in FIG. 17A;

FIG. 18 is a schematic cross sectional view illustrating a mold for molding the port core of the presently filed embodiment;

FIG. 21A is a schematic plan view illustrating a port core in which a tumble plate, of an eighth embodiment according to the present invention, is preliminarily set;

FIG. 21B is a schematic side view of the port core shown in FIG. 21A;

FIG. 22A is a schematic plan view illustrating a port core in which a tumble plate, of a ninth embodiment according to the present invention, is preliminarily set;

FIG. 22B is a schematic side view of the port core shown in FIG. 22A;

FIG. 23A is a schematic plan view illustrating a port core in which a tumble plate, of a tenth embodiment according to the present invention, is preliminarily set;

FIG. 23B is a schematic side view of the port core shown in FIG. 23A;

FIG. 24A is a schematic plan view illustrating a port core in which a tumble plate, of an eleventh embodiment according to the present invention, is preliminarily set;

FIG. 24B is a schematic side view of the port core shown in FIG. 24A;

FIG. 25A is a schematic plan view illustrating a port core in which a tumble plate, of a twelfth embodiment according to the present invention, is preliminarily set;

FIG. 25B is a schematic side view of the port core shown in FIG. 25A;

FIG. 26A is a schematic plan view illustrating a port core in which a tumble plate, of a thirteenth embodiment according to the present invention, is preliminarily set;

FIG. 26B is a schematic side view of the port core shown in FIG. 26A;

FIG. 27A is a schematic plan view illustrating a port core in which a tumble plate, of a fourteenth embodiment according to the present invention, is preliminarily set;

FIG. 27B is a schematic side view of the port core shown in FIG. 27A;

FIG. 28A is a plan view illustrating a tumble plate of a fifteenth embodiment according to the present invention;

FIG. 28B is a plan view of a tumble plate of another example of the presently filed embodiment;

FIG. 29A is a schematic plan view illustrating a port core in which a tumble plate, of sixteenth embodiment according to the present invention, is preliminarily set;

FIG. 29B is a schematic side view of the port core shown in FIG. 29A;

FIG. 32A is a schematic plan view illustrating a port core in which a tumble plate of the presently filed embodiment is preliminarily set;

FIG. 32B is a schematic side view of the port core shown in FIG. 32A;

FIG. 33 is a schematic cross sectional view illustrating a mold for molding the port core of the presently filed embodiment;

DETAILED DESCRIPTION OF THE PREFERRED EMBODIMENTS

Hereinafter, partition plates for intake ports, sand cores for forming intake-ports and cylinder heads of various embodiments according to the present invention are described in detail with suitable reference to the accompa- (First Embodiment)

A first embodiment according to the present invention is described below.

First, a cylinder head 10 with a partition plate 100 for an intake port 14 is described. Incidentally, throughout the specification, the partition plate 100 for the intake port 14 is also referred to as a "tumble plate 100".

Figure 1:
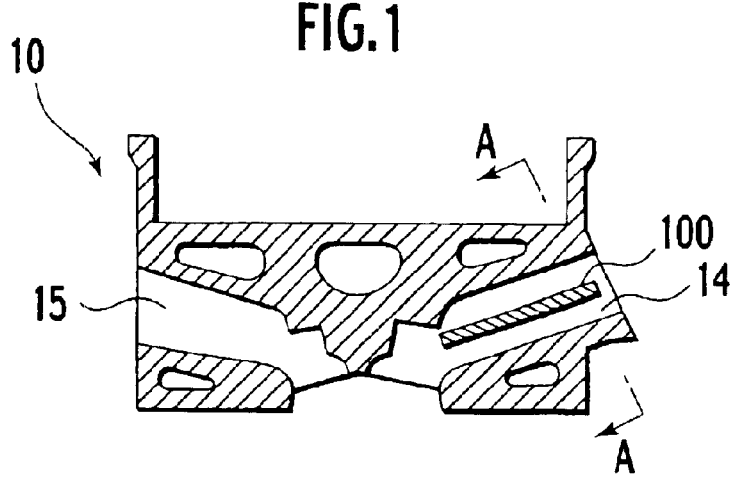
FIG. 1 is a schematic cross sectional view illustrating a cylinder head of an engine of a first embodiment according to the present invention.
Figure 2:
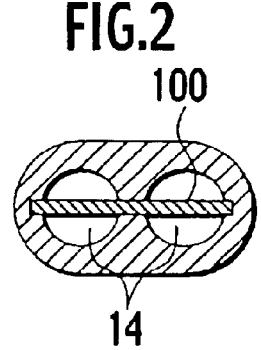
FIG. 2 is a cross sectional view, taken on a plane perpendicular to an axis of an intake port of the presently filed embodiment, which corresponds to a cross section taken on line A—A of FIG. 1.
Figure 3:
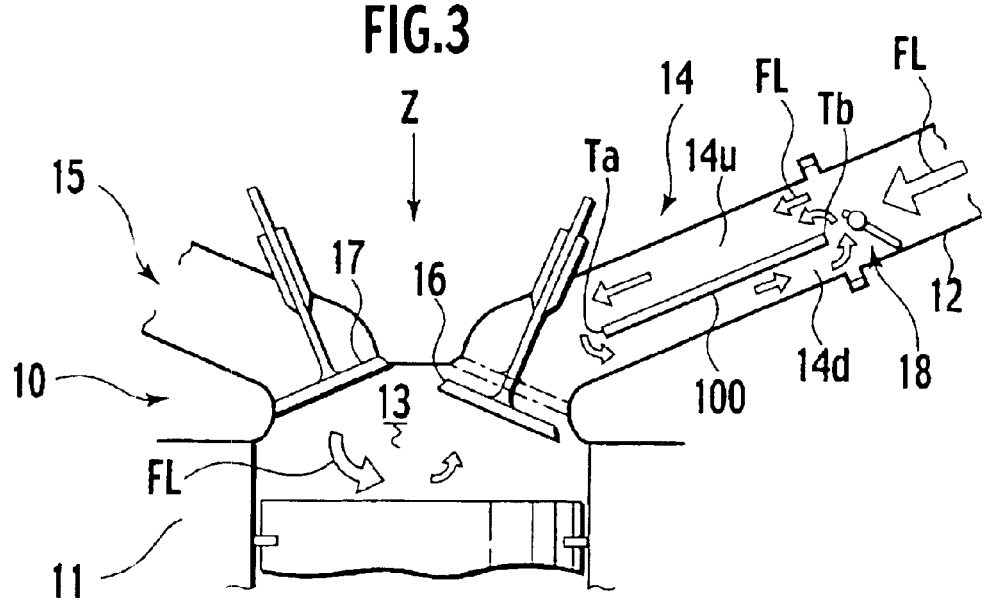
FIG. 3 is a schematic view illustrating an airflow current condition in the cylinder head of the presently filed embodiment.

FIG. 1 is a schematic cross sectional view illustrating a cylinder head 10, of an engine, of the presently filed embodiment; FIG. 2 is a cross sectional view taken on line perpendicular to an axis of the intake port 14 of the cylinder head 10; FIG. 3 is a schematic view illustrating a flow current condition in the cylinder head 10; and FIG. 4 is a schematic plan view of the cylinder head shown in FIG. 3.

As shown in FIGS. 1 to 3, the cylinder head 10 is set on a top of a cylinder block 11 and has the intake port 14 for introducing intake airflow, composed of air and fuel gas delivered from an intake manifold 12, into a cylinder bore 13 and an exhaust port 15 through which exhaust gases resulting from combustion in the cylinder bore 13 are exhausted. Incidentally, the engine intake and exhaust structure is of the type, including one cylinder with four vales, which has two intake valves 16 and two exhaust valves 17.

Disposed inside the intake port 14 is a tumble plate 100 that extends along a direction (as shown by a series of whitened arrows FL in FIG. 3) in which intake air flows from an intake side (an outer terminal side in FIG. 3) toward the cylinder side.

Connected to the cylinder head 10 at the intake-side of the tumble plate 100 is the intake manifold 12 in which a control valve 18 is disposed as shown in FIGS. 3 and 4. The intake port 14 is partitioned by the tumble plate 100 into an upper port 14$u$ and a lower port 14$d$ and on closing the lower port 14$d$ with the control valve 18, intake air flows through the upper port 14$u$ at an increased speed, resulting in the formation of strong vertical vortex flow, i.e., strong tumble flow, in the cylinder bore 13.

The intake port 14 has a passage, closer to the cylinder, which is largely curved, and with a cylinder-side distal end Ta of the tumble plate 100 located at various incorrect positions, variations occur in characteristic of airflow current to remarkably and adversely affect a situation under which tumble flow is generated. Thus, the locating position of the cylinder-side distal end Ta forms an exceptionally important position. In contrast, the locating position of the intake-side distal end Tb of the tumble plate 100 serves as a side at which intake air is divided and in which the control valve 18 is disposed. Thus, even in the presence of variation in position of the intake-side distal end Tb, no variation takes place in the characteristic of flow current and in general, the intake-side distal end Tb of the tumble plate 100 needs not to be set at a higher precision than that required for the locating position of the cylinder-side distal end Ta.

Therefore, the presently filed embodiment is able to realize a structure wherein in cast molding the cylinder head 10, the cylinder-side distal end Ta is set to a fixed location whereas the intake-side distal end Tb is relatively free to assume various positions whereby even with the tumble plate 100 suffered from thermal affects on pouring molten metal, the thermal affects can be absorbed in regions closer to the intake-side distal end Tb.

FIGS. 5A and 5B are a plan view and a side view illustrating the tumble plate 100 of the presently filed embodiment. Also, throughout the drawings, x-, y- and z-axes designate a three-axis rectangular coordinate system.

As shown in FIGS. 5A and 5B, the tumble plate 100 is preliminarily set in an intake-port forming sand core 200 (see FIGS. 6A and 6B which will be described later in detail), by which the intake port 14 of the cylinder head 10 is formed, and cast in during the formation of the cylinder head 10 in cast molding to divide the intake port 14 into the plural ports (the upper port 14$a$ and the lower port 14$d$).

Briefly, the tumble plate 100 has the both side edges Tc, which are cast in by molten metal, that have respective side end faces 101 each with a partial region formed with a solidification promoter portions 110 for promoting solidification of molten metal. Incidentally, throughout the specification described below, the intake-port forming sand core 200, in which the tumble plate 110 is preliminarily set, will be also referred to as a "port core 200".

In particular, the tumble plate 100 has a substantially rectangular configuration and is comprised of the both side edges Tc that are cast in by molten mental in cast molding the cylinder head 10, the intake-side distal end Tb that is contiguous with the both side edges Tc and is located upstream of the flow of intake air in the intake port 14, and the cylinder-side distal end Ta that is contiguous with the both side edges Tc and is located downstream of the flow of intake air in the intake port 14. An inside region, between the both side edges Tc, of the tumble plate 100 serves as a partitioning section 103 by which the intake port 14 is partitioned. Incidentally, reference numeral 102 designates end faces in a thickness direction (direction along the z-axis in FIG. 5B) of the both side edges Tc of the tumble plate 100.

The tumble plate 100 may be preferably made of material, such as aluminum alloy, in view of a weight and recycling capability.

Although it may be preferable for the tumble plate 100 to be formed of a thin-walled plate member to reduce resistance in flow of intake air passing across the intake port 14, for the tumble plate 100 made of material such as aluminum alloy, the tumble plate 100 may preferably have a thickness of a value equal to or greater than approximately 1.5 mm when taking into consideration a need for precluding thermal distortion that would occur on heat treating a cast product of the cylinder head 10.

No particular limitation is intended for a method of manufacturing the tumble plate 100 and for the purpose of simply fabricating cast products in equal quality at low costs, it may be preferable for the tumble plate 100 to be formed by press forming.

Of the both side edges Tc, the side end faces 101 have partial regions on which the respective promoter portions 110 are formed and with the presently filed embodiment, such partial regions are set to be closer to the cylinder-side distal end Ta.

More particularly, the promoter portions 110 are constituted by concave portions 111 formed on the respective side end faces 101 of the both side edges Tc. The concave portions 111, shown in the drawing figure, have semicircular arc shapes, respectively. Of course, it is needless to say that the concave portions 111 may be altered in the form of indents in various shapes, sizes, the number of pieces, locating positions and locating precisions on consideration of a locating precision, required for the tumble plate 100, and thermal expansion of the tumble plate 100.

In addition to this, the intake-side distal end Tb of the tumble plate 100 may be chamfered. This is because there are probabilities where an end face of the cylinder head 10, to which the intake manifold 12 is connected, is processed by machining using cutters on a subsequent processing stage after cast molding the cylinder head 10 and the intake-side distal end Tb of the tumble plate 100 can be more smoothly cut away to minimize back burrs from occurring in machining operations.

Incidentally, for conveniences of description, of both the side edges Tc of the tumble plate 100, partial regions formed with the respective promoter sections 100 will be also referred to as a solidification promoter section "a" and the other remaining region with no formation of the promoter portions 110 will be also referred to as a flat and smooth section "b".

Figure 8:
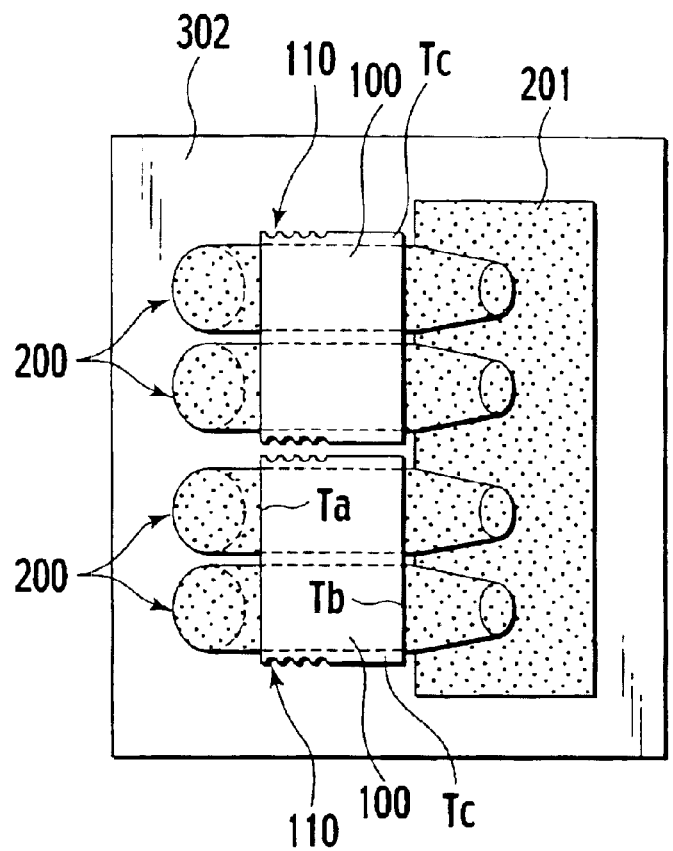
FIG. 8 is a schematic plan view illustrating the mold, for molding the port core of the presently filed embodiment, which is broken away to expose the tumble plate.

FIGS. 6A and 6B are a schematic plan view and a schematic side view illustrating a port core 200 in which the tumble plate 100 is preliminarily set. Also, FIG. 7 is a schematic cross sectional view illustrating a mold 300 for molding the port core 200 and FIG. 8 is a schematic plan view illustrating a condition where the mold 300, for molding the port core 200, is cut away to allow the tumble plate 100 to be exposed. Incidentally, the mold 300 for molding the port core 200 will be hereinafter referred to as a "core mold 300".

As shown in FIG. 7, in cast molding the cylinder head 10, first, using the core mold 300 allows the port core 200 to be molded as shown in FIGS. 6A and 6B.

The port core 200 is set in a casting mold 400 (see FIG. 9), by which the cylinder head 10 is cast, to form the intake port 14 of the cylinder head 10 on solidifying molten metal. The tumble plate 100 is preliminarily set in the port core 200 with the both side edges Tc protruding outward to be cast in with molten metal.

The both side edges Tc, protruding outward, of the tumble plate 100 play a role as regions to ensure the tumble plate 100 to be more reliably held when these regions are cast in by molten metal. Although no particular limitation is intended to cast-in widths of the both side edges Tc, the cast-in widths may be determined to lie in a value of approximately 2 mm.

Here, with the cylinder head 10 cast molded, the both side edges Tc of the tumble plate 100 are not fused to the cylinder head 10. This is because it is considered that with the tumble plate 100 fused to the cylinder head 10, the tumble plate 100 may suffer from adverse affects resulting from thermal shocks and vibrations occurring at repeated cycles in use on the engine. Thus, the tumble plate 100 is not fused to the cylinder head 10 and cast-in portions of the tumble plate 100 in the cylinder head 10 take the form of cutout shaped portions. For this reason, if the cast-in width increases in excess, a depth of the cutouts increases to cause stress concentration to occur at the cutout shaped portions, resulting in factors for causing deterioration in structural strength of the cylinder head 10. Of course, probabilities exist where a whole of or a partial region of the cylinder head 10 need to have a reduced wall thickness for the purpose of improving a water-jacket cooling performance of the cylinder head 10 or of providing a lightweight structure. Accordingly, with such circumstances in mind, it is preferable for a cast-in margin to be minimized as small as possible.

At this point, the tumble plate 100 has the both side edges Tc formed with the promoter portions 110, through which the solidification of molten metal is promoted, such that the solidification promoter section "a" on the both side edges Tc is possible to decrease the cast-in widths as small as possible. Accordingly, this results in a decrease in depth of the cutouts for minimizing the occurrence of stress concentration at the cutout shaped portions, resulting in an increase in a structural strength of the cylinder head 10. Therefore, the presence of the decreased wall thickness of the cylinder head 10 enables contribution to improvement in a cooling performance of the engine and lightweight structure.

By the way, the core mold 300 is comprised of a plurality of mold segments such as a core-forming upper half and a core-forming lower half. With these mold segments brought into abutment, a mold cavity 303 is internally created for forming the port core 200. Core sand is blown into this mold cavity 303 and compacted, resulting in the formation of the port core 200.

More particularly, as shown in FIG. 8, core sand is blown under a condition where the tumble plate 100 is preliminarily set in the core mold 300, thereby forming the port core 200. The tumble plate 100 is set in position with no displacement in the core mold 300 and located on a rest formed on a parting surface of the core-forming lower half 302. That is, the tumble plate 100 is held in the core mold 302 in such a manner that the marginal portions are set in a circumferential edge of the mold cavity.

The port core 200, formed in the core mold 300, is taken out by separating the mold segments such as the core-forming upper half 301 and the core-forming lower half 302 in a separating direction, as shown by an arrow S in FIG. 7, i.e., in a direction to cause the mold segments to separate from one another. Incidentally, in FIG. 7, reference numeral 201 designates a core print of the port core 200.

Figure 9:
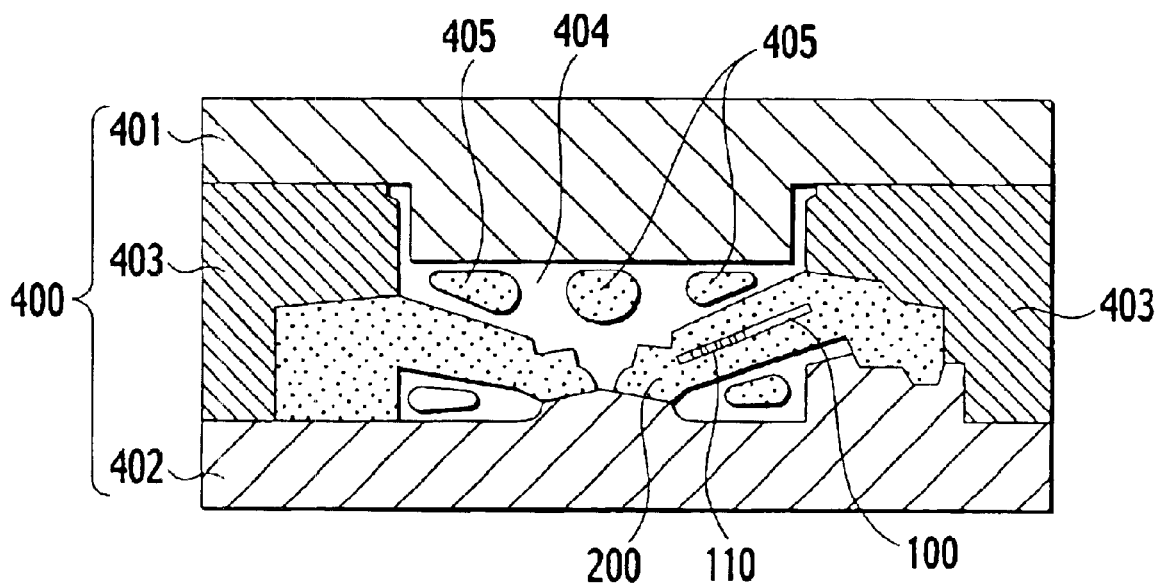
FIG. 9 is a schematic cross sectional view illustrating a casting mold, for cast molding the cylinder head of the presently filed embodiment, under a condition in which the port core is set.

FIG. 9 is a schematic cross sectional view illustrating a condition under which the port core 200 is set in the casting mold 400 for cast molding the cylinder head 10.

As shown in FIG. 9, the port core 200 is set in the casting mold 400 for cast molding the cylinder head 10. The casting mold 400 is comprised of an upper half mold 401, a lower half mold 402 and side molds 403, and the port core 200 is supported between the lower half mold 402 and the side molds 403 whereupon the casting mold 400 is closed by the upper half mold 401, thereby forming the mold cavity 404 in which the cylinder head 10 is cast molded. Incidentally, in the drawing figure, reference numeral "405" denotes cores for forming a water jacket. Examples of casting methods may include a low-pressure die-casting method (LPDC).

Under such a condition, pouring molten metal, such as aluminum alloy, into the mold cavity 404 through a pouring gate (not shown) allows the cylinder head 10 to be formed as shown in FIG. 1 and on pouring molten metal, thermal expansion, caused by heat of molten metal, results in the tumble plate 100 set in the port core 200.

Here, as set forth above, on the side end faces 101 of the both side edges Tc of the tumble plate 100, the partial regions, closer to the cylinder-side distal end Ta, are formed with the respective promoter portions 110 that are formed of the concave portions 111, respectively. The promoter portions 110 serve as a key to promote the solidification of molten metal in the vicinity of the partial regions (on the solidification promoter section "a"), at which the promoter portions 110 are provided, further than that of molten metal in the vicinity of the other remaining region (on the flat and smooth section "b"). That is, rapidly solidifying molten metal in the vicinity of the solidification promoter section "a" provides an action to regulate a position at which the tumble plate 100 is located with respect to the intake port 14.

With the port core 200, in which the tumble plate 100 formed with such promoter portions 110 is preliminarily set, set in the casting mold 400, pouring molten metal into the mold cavity 404 allows the both side edges Tc of the tumble plate 100 to be cast in and on solidifying molten metal, a whole of the both side edges Tc is finally fixed.

With the cast molding completed, the cores, such as the port core 200, are removed, thereby obtaining the cylinder head 10 as a cast product.

In this connection, of the both side edges Tc, the solidification promoter section "a" closer to the cylinder-side distal end Ta has the surfaces, extending along the respective side end faces 101 of the both side edges Tc, i.e., the surfaces which extends in a longitudinal direction (a direction along the y-axis while varying in a direction along the x-axis), to have a contact area per unit length larger than that of the flat and smooth section "b" due to the presence of the concave portions 111. For this reason, when the both side edges Tc of the tumble plate 100 are cast in, molten metal in the vicinity of the solidification promoter section "a" is rapidly quenched relative to molten metal in the vicinity of the flat and smooth section "b", thereby promoting the solidification of molten metal. Additionally, the presence of the concave portions 111 increases flow resistance of molten metal passing across the concave portions 111 and molten metal in the vicinity of the solidification promoter section "a" is apt to relatively stay further than molten metal in the vicinity of the flat and smooth section "b", resulting in further increased promotion to solidify molten metal.

Thus, a combination between the action for quenching molten metal due to the presence of the promoter portions 110 and the action for causing molten metal to stay in an increased residence promotes the solidification of molten metal in the vicinity of the solidification promoter section "a" further than the solidification of molten metal in the vicinity of the flat and smooth section "b".

This allows the solidification promoter section "a" on the both side edges Tc to be fixed faster than the flat and smooth section "b", thereby regulating the locating position of the tumble plate 100 with respect to the intake port 14. Also, the presence of the concave portions 111 increases resistance of the tumble plate 100 tending to move in molten metal under a semi-solidified condition, resulting in a difficulty for the tumble plate 100 to move for thereby preventing the tumble plate 100 from being displaced in incorrect positions.

That is, of the both side edges, the partial regions closer to the cylinder-side distal end Ta are fixed in place faster than the other regions closer to the intake-side distal end Ta, thereby preventing the cylinder-side distal end Ta from being displaced with respect to the intake port 14.

Further, with the solidification of molten metal promoted in the vicinity of the solidification promoter section "a", a gas-tightness is reliably enhanced even in the presence of sand or resin films remaining somewhat around the both side edges Tc, ensuring the tumble plate 100 to be reliably fixed in place.

This enables remarkable reduction in looseness of the tumble plate 100 in the cylinder head 10 as the cast product on completing the cast molding.

Further, of the both side edges Tc, the solidification promoter section "a" is fixed in advance of the smoothed section "b" and the flat and smooth section "b" is fixed relatively slower than the solidification promoter section "a". For this reason, it becomes possible for a direction, in which the tumble plate 100 is caused to thermally expand due to heat of molten metal, to be limited or controlled to one direction in which molten metal moves from the solidification promoter section "a", at which molten metal begins to solidify, toward the flat and smooth section "b" where molten metal remains semi-solidified.

That is, with the tumble plate 100 having the regions, closer to the cylinder-side distal end Ta, fixed in advance, it becomes possible to limit a direction, along which the tumble plate 100 thermally expands, to a direction along which the tumble plate 100 thermally expands toward the intake-side distal end Ta.

Furthermore, since the thermal expansion of the tumble plate 100 intensively occurs at the intake-side distal end Ta that is liable to expand, no probabilities occur in which the port core 200 is pressurized by the cylinder-side distal end Ta. Consequently, no cracks or damages occur in important regions of the port core 200 for forming the shape of the intake port 14.

Moreover, even if the thermal expansion of the tumble plate 100 is great, the port core 200 is pressurized by the intake-side distal end Ta and the occurrence of cracks, which would occur in the port core 200, can be guided to or inducted to a region closer to the core print 201. Thus, burrs resulting from the cracks of the port core 200 do not occur in the inside of the cylinder head 10 as a cast product after completing the cast molding but in a product-profile outside region. Accordingly, this provides an ease of subsequent deburring work, or no need arises for carrying out such troublesome work.

As set forth above, with the structure of the presently filed embodiment, even in the presence of thermal expansion of the tumble plate 100, the tumble plate 100 is cast in at a high precision with the cylinder-side distal end Ta remaining in an important position.

Consequently, the positional displacement of the tumble plate 100 or looseness thereof inside the cast product can be adequately minimized to achieve improvement in a product quality and in addition, it becomes possible to provide an ease of deburring work in subsequent processing by causing burrs, resulting from the presence of cracks in the port core 200, to occur in partial regions.

By the way, as discussed above, since the locating position of the tumble plate 100 with respect to the intake port 14 can be regulated, the cylinder-side distal end Ta of the tumble plate 100 can be located at a limit position with no occurrence of interference with a fuel injection region or a valve actuation region.

Figure 10A:
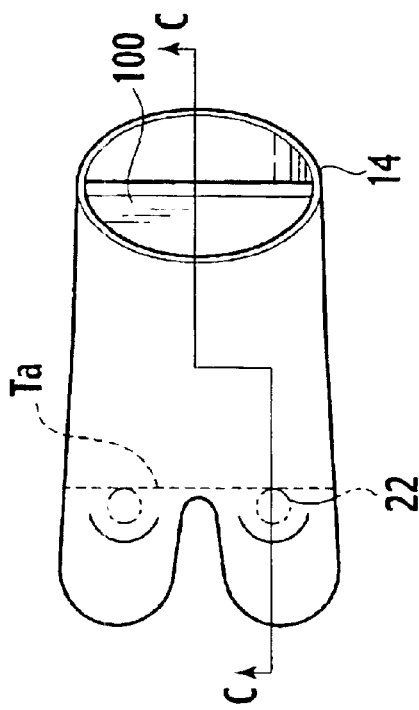
FIG. 10A is a schematic plan view illustrating an intake port of the cylinder head, of the presently filed embodiment, into which a multi-point injection (MPI) type fuel injection unit is incorporated.
Figure 10B:
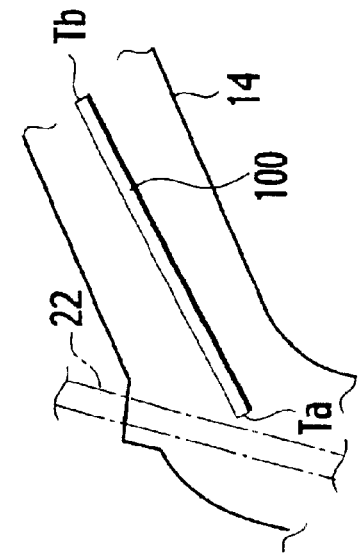
FIG. 10B is a schematic cross sectional view taken on line B—B of FIG. 10A.
Figure 10C:
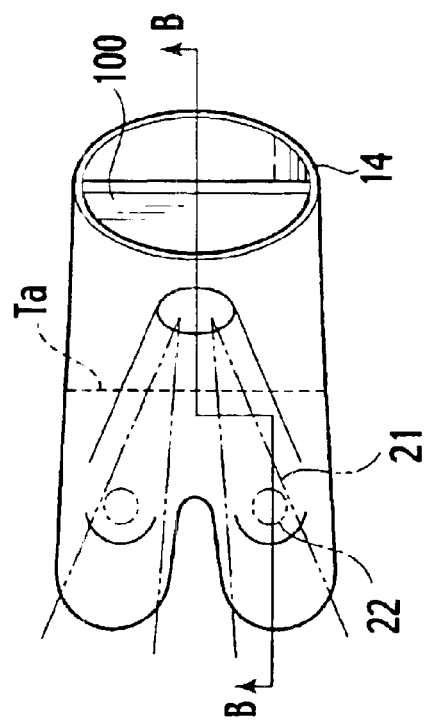
FIG. 10C is a schematic plan view illustrating an intake port of the cylinder head, of the presently filed embodiment, into which a single-point injection (SPI) type fuel injection unit is incorporated.
Figure 10D:
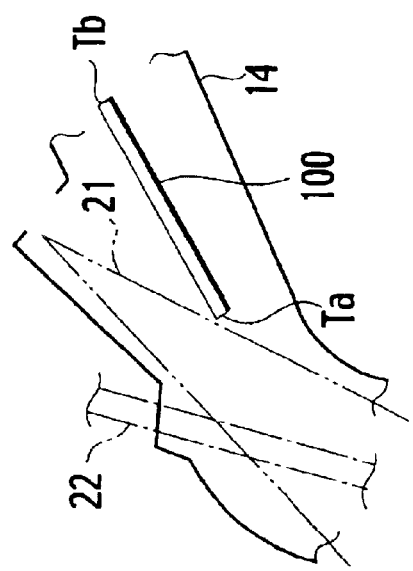
FIG. 10D is a schematic cross sectional view taken on line C—C of FIG. 10C.

FIGS. 10A and 10B are a schematic plan view and a schematic cross sectional view illustrating an outline of the intake port 14 of the cylinder head 10 to which a multi-point injection (MPI) type fuel injection unit is to be set, and FIGS. 10C and 10D are a schematic plan view and a schematic cross sectional view illustrating an outline of the intake port 14 of the cylinder head 10 to which a single-point injection (SPI) type fuel injection unit is to be set.

That is, as shown in FIGS. 10A and 10B, with the cylinder head 10 to which the MPI type fuel injection unit is to be set, the cylinder-side distal end Ta can be located at the limit position with no occurrence of interference between the fuel injection regions 21 and the valve actuation regions 22.

Further, as shown in FIGS. 10C and 10D, with the cylinder head 10 to which the SPI type fuel injection unit is to be set, the cylinder-side distal end Ta can be located at the limit position with no occurrence with the valve actuation regions 22.

Thus, the presence of the cylinder-side distal end Ta, located at the limit position with no interference with the fuel injection regions 21 or the valve actuation regions 22, enables desired tumble flow to reliably occur in the cylinder bore 13, enabling improvement in fuel consumption in a reliable manner.

Incidentally, while the presently filed embodiment set forth above has been shown with reference to the promoter portions 110 that are constituted by the concave portions 111 formed on the side end faces 101 on the both side edges Tc, the present invention is not limited to such an exemplary case.

For example, the promoter portions 110 may take the form of suitable configurations, as far as the solidification of molten metal is promoted, and may be constituted by convex portions or concave and convex portions formed on the side end faces 101 of the both side edges Tc. Also, the promoter portions 110 may take not only a semi-circular arc configuration but also other suitable configurations such as a triangular configuration or a rectangular configuration. An alternative may include the concave portions, convex portions and suitable combination between the concave portions and the convex portions, and different kinds of configurations may be combined in a mixture.

(Second Embodiment)

Next, a second embodiment according to the present invention is described.

FIGS. 11A and 11B are a schematic plan view and a schematic side view illustrating a port core 200a in which a tumble plate 100a of the presently filed embodiment is preliminarily set.

As shown in FIGS. 11A and 11B, the tumble plate 100a of the presently filed embodiment differs from the first embodiment in that regions (forming the solidification promoter section "a") of the both side edges Tc, in which the promoter portions 110 are provided, have a larger cast-in width than that of the other regions (forming the flat and smooth section "b") of the both side edges Tc whereas in the first embodiment, the both side edges Tc have a cast-in width in an equal value. Incidentally, other structure is identical to the first embodiment.

Such a cast-in width may be determined in a suitable dimension depending upon a wall thickness of the intake port 14 and a thickness of the tumble plate 100a and to take such one example, for the cast-in width L1 of the smoothed portion 100a set in a value of approximately 2 mm, the solidification promoter section "a" is set to have a cast-in width L2 in a value ranging from approximately 2.5 mm to 3 mm.

Thus, with the presently filed embodiment, the presence of the cast-in width L2 lying in an increased range at the solidification promoter section "a" results in an increase in a tight contact surface with the cylinder head 10, i.e., a cylinder head body, to cause the solidification promoter section "a" to be more firmly fixed in place, enabling to further increase a locating precision of the cylinder-side distal end Ta, forming an important position, with respect to the intake port 14.

Further, since the tumble plate 100a has an increased area exposed to heat of molten metal to cause rapid increase in temperature of the tumble plate 100, the tumble plate 100a is able to extend far enough to a level available to absorb an increase in an extending length of the tumble plate 100a prior to the solidification of surrounding molten metal. This enables to further prevent the occurrence of cracks or damages to the port core 200.

Incidentally, since the cast-in width of the both side edges Tc is enabled to be reduced as small as possible, it becomes possible for factors causing deterioration in a structural strength of the cylinder head 10 to be avoided even in the presence of a slight increase in depth of the cutouts resulting from the slightly increased cast-in width of the tumble plate 100a like in the presently filed embodiment.

(Third Embodiment)

Next, a third embodiment according to the present invention is described.

FIGS. 12A and 12B are a schematic plan view and a schematic side vice illustrating a port core 200b in which a tumble plate 100b of the present invention is preliminarily set.

As shown in FIGS. 12A and 12B, the tumble plate 100b of the presently filed embodiment differs from the first embodiment in that the presently filed embodiment takes the form of a structure wherein with the tumble plate 100b of the presently filed embodiment, the promoter portions 110 are formed on the respective side end faces 101 of the both side edges Tc at positions closer to the intake-side distal end Tb whereas in the first embodiment, the promoter portions 110 are located in the positions closer to the cylinder-side distal end Ta. Incidentally, the other structure is similar to that of the first embodiment.

Depending upon a structure of the intake port 14 and the type of the fuel injection unit, it is probable for the intakeside distal end Tb to satisfy requirements to be located at an increased precision. In such cases, it may be sufficed for the promoter portions 110 to be located on the side end faces 101 of the both side edges Tc at positions closer to the intake-side distal end Tb.

With such a structure, a combination between the action for quenching molten metal through the promoter portions 110 and the action for causing molten metal to stay excels at promoting the solidification of molten metal in the vicinity of the solidification promoter section "a" than that of molten metal in the vicinity of the flat and smooth section "b". This causes the solidification promoter section "a" of the both sides edges Tc to be fixed faster than the flat and smooth section "b", thereby regulating the locating position of the tumble plate 100b with respect to the intake port 14.

As set forth above, with the presently filed embodiment, the regions closer to the intake-side distal end Tb of the both side edges Tc of the tumble plate 100b is fixed faster than the other regions closer to the cylinder-side distal end Ta, enabling to prevent the positional displacement of the intake-side distal end Tb with respect to the intake port 14.

Incidentally, although the present invention has been exemplarily heretofore described with reference to the structures wherein the partial regions of the tumble plate 100, 100a, 100b needed for an increased locating position lie at the cylinder-side distal end Ta (first and second embodiments) and the intake-side distal end Tb (third embodiment), the promoter portions 110 may be located at any arbitrary positions in which an increased locating position is required. If a central position of the tumble plate is required to lie at an increased locating precision, the promoter portions 110 may be located at substantially central regions of the both side edges Tc in the longitudinal direction thereof.

(Fourth Embodiment)

Next, a fourth embodiment according to the present invention is described.

FIGS. 13A and 13B are a schematic plan view and a schematic side vice illustrating a port core 200c in which a tumble plate 100c of the presently filed embodiment is preliminarily set.

As shown in FIGS. 13A and 13B, the tumble plate 100c of the presently filed embodiment differs from the first embodiment in a structure where concave portions 112, 113, corresponding to members for promoting the solidification of molten metal, are formed on entire regions of the side end faces 101 on the both side edges Tc of the tumble plate 100c so as to vary the degree in which the members 112, 113 promotes the solidification of molten metal along the longitudinal direction of the tumble plate 100c whereby the side end faces 101 have partial regions formed with the promoter portions 110 for relatively or substantially promoting the solidification of molten metal in contrast to the structure of the first embodiment wherein the concave portions 11 are formed in the specified regions of the tumble plate 100. Incidentally, the other structure is similar to that of the first embodiment.

Depending on a structure of the intake port 14, there are probabilities where a whole of the both side edges Tc of the tumble plate 100c is required to be firmly fixed along a longitudinal direction thereof. In such cases, it may be sufficed for the concave portions 112, 113 to be formed on entire regions of the side end faces 101 in the longitudinal direction thereof. However, the locating precision required for the cylinder-side distal end Ta of the tumble plate 100c and the locating precision required for the intake-side distal end Tb differ from one another and, in addition, a need arises for a direction, in which the tumble plate 100c thermally expands due to heat of molten metal, to be limited or controlled to lie in one direction.

The exemplary structure, shown in the drawing figures, has been exemplified where the cylinder-side distal end Ta is required to have a higher locating precision than that of the intake-side distal end Tb, and the concave portions 112 closer to the cylinder-side distal end Ta are designed in configurations to have larger indents than those of the concave portion 113 closer to the intake-side distal end Tb. The concave portions 112 with larger indents (hereinafter referred to as "large concave portions 112") have relatively increased effect of quenching molten metal or of causing molten metal to stay further than those of the concave portions 113 with small indents 113 (hereinafter referred to as "small concave portions 113").

Accordingly, even on forming the concave portions 112, 113 on the entire regions of the side end faces 101 along the longitudinal direction of the tumble plate 100c, varying a size of indent configurations of the concave portions 112, 113 allows the promoter portions 110 to be relatively or substantially located on partial regions of the respective side end faces 101 of the both side edges Tc. That is, the partial regions in which the large concave portions 112 are formed play a role as the solidification promoter section "a".

With such a structure, due to the presence of the concave portions 112, 113 formed on the entire regions of the side end faces 101 along the longitudinal direction thereof, the both side edges Tc can be firmly fixed in place throughout the entire regions in the longitudinal direction. In addition, molten metal in the vicinity of the large concave portions 112, serving as the promoter portions 110, can be solidified faster than molten metal in the vicinity of the small concave portions 113. This allows the solidification promoter section "a", in which the large concave portions 112 are located, of the both side edges Tc of the tumble plate 100c to be fixed faster than the regions in which the small concave portions 113 are located, thereby regulating the locating position of the tumble plate 100c with respect to the intake port 14.

As set forth above, with the presently filed embodiment, the regions closer to the cylinder-side distal end Ta of the both side edges Tc of the tumble plate 100c are fixed faster than the other regions closer to the intake-side distal end Tb, enabling the cylinder-side distal end Ta to be prevented from being displaced with respect to the intake port 14.

Further, a direction in which the tumble plate 100 thermally expands can be limited to a direction in which thermal expansion is directed toward the intake-side distal end Tb and no cracks or damages occur to the important regions for forming the shape of the intake port 14.

Incidentally, even with the presently filed embodiment, it is, of course, to be appreciated that the members for promoting the solidification of molten metal may be constituted by the concave portions 112, 113 and, in addition to these, convex portions and concave and convex portions in combination.

Also, in order to vary the degree at which molten metal is solidified through the use of the members for promoting the solidification of molten metal, an alternative may take the form of a structure wherein the indent configurations of the concave portions 112, 113 can be varied in size, as set forth above, and in addition to this, a structure wherein with a size remained unchanged, the number of pieces, locating positions and locating densities (in "coarse" and "dense" conditions) of the concave portions 112, 113 may be varied depending upon a degree at which the locating precision is required.

Still also, in varying the degree at which molten metal is solidified along the longitudinal direction of the tumble plate 100c, it is needless to say that an alternative may employ a structure for causing molten metal to be solidified at degree in two stages, a structure for causing molten metal to be solidified in stepwise degrees in more than three stages or in a structure for causing molten metal to be continuously solidified.

(Fifth Embodiment)

Next, a fifth embodiment according to the present invention is described.

FIG. 14 is a plan view illustrating a tumble plate 100d of the presently filed embodiment.

As shown in FIG. 14, in consideration of the tumble plate 100d of the presently filed embodiment that is preferable to be fabricated on press forming in view of simply manufacturing products in identical quality at low costs as set forth above, nooks or corners of the concave portions 111, forming the promoter portions 110, are smoothly formed in round shapes 114, respectively.

With such configurations of the concave portions 111, stamping can be simply carried out to form the concave portions 111 constituting the promoter portions 110, resulting in improvement in press forming capability.

Of course, even with the concave portions 111 configured in such shape, the promoter portions 110 excels at action for quenching molten metal and action for causing molten metal to stay for enabling the solidification of molten metal in the vicinity of the solidification promoter section "a" to be more promoted than that of molten metal in the vicinity of the flat and smooth section "b". This allows the both side edges Tc of the tumble plate 100d to be fixed faster than the flat and smooth section "b", regulating the locating position of the tumble plate 100d with respect to the intake port 14.

(Sixth Embodiment)

Next, a sixth embodiment according to the present invention is described.

FIGS. 15A and 15B are schematic plan views illustrating tumble plates 100e, 100f of the presently filed embodiment.

As set forth above, since the port core 200 is molded by blowing core sand into the mold cavity under a condition where the tumble plate 100 is preliminarily set in the core mold 300, it may be occasionally required for the left and right side marginal edges Tc of the tumble plate 100 to have different shapes and cast-in widths on consideration of a flowing behavior of molten metal. For the tumble plate 100 with a distinction between both sides thereof, there is a need for the both sides of the tumble plate 100 to be orientated in correct orientations on forming the port core 200.

In such cases, it may be preferable for tumble plates 100e, 100f to take structures to prevent these from being erroneously placed in the core mold 300 like in the presently filed embodiment.

In particular, the tumble plate 100e has one side formed with a notch 115 as shown in FIG. 15A and the tumble plate 100f have concave portions 111, forming the promoter portions 110, which are formed at non-symmetric positions on both side edges Tc as shown in FIG. 15B.

(Seventh Embodiment)

Next, a seventh embodiment according to the present invention is described.

FIGS. 16A and 16B are a plan view and a side view illustrating a tumble plate 100g of the presently filed embodiment. Incidentally, throughout the drawing figures, x-, y- and z-axes designate a three-axis rectangular coordinate system.

As shown in FIGS. 16A and 16B, the tumble plate 100g is of the type that is preliminarily set in an intake-port forming sand core 200g (see FIGS. 17A and 17B), which will be described later, by which the intake port 14 of the cylinder head 10 is formed and, briefly describing, differs from the first embodiment in that promoter portions 120 for promoting the solidification of molten metal are formed on partial regions of the end faces 102 in a thickness direction (direction along the z-axis in FIG. 16B) of the both side edges Tc of the tumble plate 100g. Incidentally, the other structure is identical to the first embodiment. Further, throughout the following description, similarly, the intake-port forming sand core 200g, in which the tumble plate 100g is preliminarily set, is also referred to as a "port core 200g".

In particular, the tumble plate 100g has a substantially rectangular shape and is comprised of the both side edges Tc that are cast in by molten metal in cast molding the cylinder head 10, the intake-side distal end Tb that is continuous with the both side edges Tc and disposed upstream of the flow of intake air inside the intake port 14, and the cylinder-side distal end Ta that is continuous with the both side edges Tc and disposed downstream of the flow of intake air. A region inside the both side edges Tc forms the partitioning section 103 by which the intake port 14 is partitioned.

The promoter portions 120 are formed in partial regions of the end faces 102, in a thickness direction, of the both side edges Tc at positions closer to the cylinder-side distal end Ta. The promoter portions 120 include projections 121 formed on the end faces 102, facing in the thickness direction, of the both side edges Tc. It is needless to say that although the projections 121, shown as examples in the drawing figures, have columnar shapes, a shape, a size, the number of pieces, a locating position and a location density of the projections 121 may be altered in consideration of a locating precision required for the tumble plate 100g and thermal expansion of the tumble plate 100g.

Incidentally, for conveniences of description, of the both side edges Tc of the tumble plate 100g, the partial regions at which the promoter portions 120 are located are also referred to as the solidification promoter section "a" and the other remaining region with no provision of the promoter portions 120 is also referred to as the flat and smooth section "b".

Figure 19:
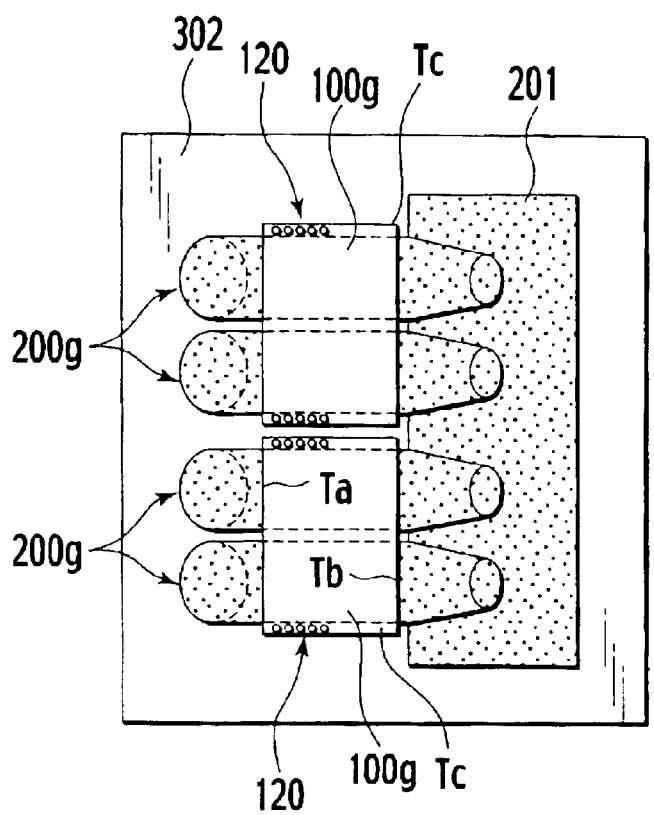
FIG. 19 is a schematic plan view illustrating the mold, for molding the port core of the presently filed embodiment, which is broken away to expose the tumble plate.

FIGS. 17A and 17B are a schematic plan view and a schematic side view illustrating the port core 200g in which the tumble plate 100g of the presently filed embodiment is preliminarily set. Also, FIG. 18 is a schematic cross sectional view illustrating a mold 300g for molding the port core 200g, and FIG. 19 is a schematic plan view illustrating a condition wherein the mold 300g for molding the port core 200g are cut away to expose the tumble plate 100g. Incidentally, in the following description, the mold 300g for molding the port core 200g is also referred to as a "core mold 300".

As shown in FIG. 18, in cast molding the cylinder head 10, first, using the core mold 300g allows the port core 200g to be mold as shown in FIGS. 17A and 17B.

The port core 200g is set in a casting mold 400g (see FIG. 20 that will be described later), by which the cylinder head 10 is cast, for forming the intake port 14 of the cylinder head 10. The port core 200g is preliminarily set such that the tumble plate 100g has both side edges Tc exposed outside to be cast in by molten metal.

The both side edges Tc, exposed outside, of the tumble plate 100g serve as portions to ensure the both side edges Tc to be more reliably retained when the both side edges Tc are cast in by molten metal. Cast-in widths of the both side edges Tc are not particularly limited and may lie in a value of approximately 2 mm. With the cylinder head 10 cast molded, the both side edges Tc of the tumble plate 100g are not fused to the cylinder head 10.

Thus, promoting the solidification of molten metal with the promoter portions 120, disposed on the both side edges Tc, allows the solidification promoter section "a" of the both side edges Tc to be firmly fixed, making it possible to reduce the cast-in widths as small as possible. Accordingly, this decreases a notch depth to preclude stress concentration from occurring at regions around the notch configurations, providing an increase in structural strength of the cylinder head 10. Additionally, reducing a wall thickness of the cylinder head 10 results in contribution to improvements in a cooling performance and lightweight structure of an engine.

Also, with the promoter portions 120 disposed in the thickness direction of the both side edges Tc, the cast-in widths of the both side edges Tc can be made further smaller than those of the both side edges Tc formed with the concave portions, forming the promoter portions, as discussed in the first embodiment, thereby enabling the tumble plate 100g to further remarkably excel the above-described advantages such as the effect of increasing the structural strength of the cylinder head 10.

As shown in FIG. 19, with the tumble plate 100g preliminarily set in the core mold 300g, core sand is blown into a mold cavity, thereby forming the port core 200g. The tumble plate 100g is positioned in a manner not to cause displacement of the tumble plate 100g in the core mold 300g and set on a rest formed on a parting surface of the core mold 300g. That is, the tumble plate 100g is held on a circumferential periphery of the mold cavity of the core-forming lower half 302.

Thus, the port core 200g formed inside the core mold 300g is taken out by separating the mold segments, such as the core-forming upper half 301 and the core-forming lower half 302, in a separating direction as shown by an arrow S in FIG. 18.

Figure 20:
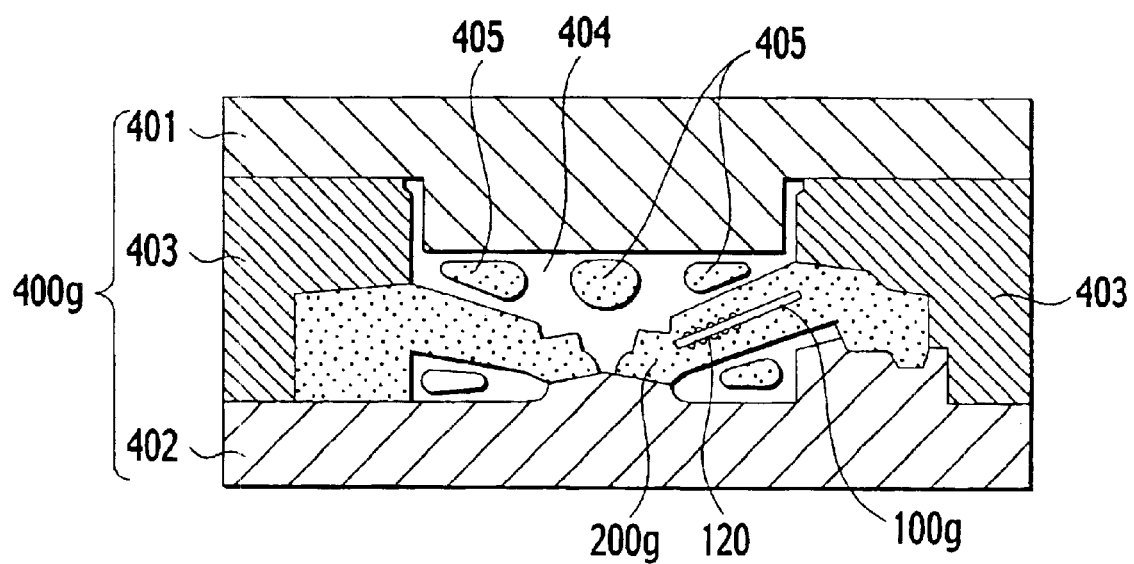
FIG. 20 is a schematic cross sectional view illustrating a casting mold, for cast molding the cylinder head of the presently filed embodiment, under a condition in which the port core is set.

FIG. 20 is a schematic cross sectional view illustrating a condition where the port core 200g is set in the casting mold 400g for casting the cylinder head 10.

As shown in FIG. 20, the port core 200g is set in the casting mold 400g for forming the cylinder head 10.

Under such a condition, pouring molten metal, such as aluminum alloy, into a mold cavity 404 from an in-gate (not shown) allows the cylinder head 10 to be cast molded and during such a pouring stage, thermal expansion results in the tumble plate 100g set in the port core 200g due to heat of molten metal.

With the presently filed embodiment, of the end faces 102, facing in the thickness direction, of the both side edges Tc of the tumble plate 100g, the partial regions closer to the cylinder-side distal end Ta are formed with the promoter portions 120 including the convex portions 121. The promoter portions 120 are effective to promote the solidification of molten metal in the vicinity of the partial regions (forming the solidification promoter section "a"), in which the promoter portions 120 are provided, further than the solidification of molten metal in the vicinity of the other region (flat and smooth section "b"), thereby regulating the locating position of the tumble plate 100g with respect to the intake port 14.

With the port core 200g, in which the tumble plate 100g formed with such promoter portions 120 is preliminarily set, located in the casting mold 400g, pouring molten metal into the mold cavity 404 allows the both side edges Tc of the tumble plate 100g to be cast in with molten metal while causing molten metal to be solidified, permitting a whole of the both side edges Tc to be fixed in place.

On completing the cast molding, the cores, such as the port core 200g, are removed, thereby obtaining the cylinder head 10 as a cast product.

Here, due to the presence of the convex portions 121, of the both side edges Tc, the solidification promoter section "a", closer to the cylinder-side distal end Ta, have a larger contact area with molten metal at the end faces 102 than those of the flat and smooth section "b". For this reason, during a phase where the both ends Tc of the tumble plate 100g are cast in, molten metal in the vicinity of the solidification promoter section "a" is relatively quenched as compared to molten metal in the vicinity of the flat and smooth section "b", thereby promoting the solidification of molten metal. In addition, since flow resistance, occurring when molten metal flows, increases due to the presence of the convex portions 121, molten metal in the vicinity of the solidification promoter section "a" is apt to relatively stay as compared to molten metal in the vicinity of the flat and smooth section "b", thereby promoting the solidification of molten metal.

Thus, a combination between the action for quenching molten metal through the promoter portions 120 and the action for causing molten metal to stay excels at promoting the solidification of molten metal in the vicinity of the solidification promoter section "a" further than the solidification of molten metal in the vicinity of the flat and smooth section "b".

This allows the solidification promoter section "a" of the both side edges Tc to be fixed in place faster than the flat and smooth section "b", thereby regulating the locating position of the tumble plate 100g with respect to the intake port 14. Also, the presence of the convex portions 121 increases resistance occurring when the tumble plate 100g tends to move in molten metal under a semi-solidified condition. In view of this, the movement of the tumble plate 100g is restricted, thereby preventing the tumble plate 100g from displacement in incorrect positions.

That is, the regions of the both side edges Tc closer to the cylinder-side distal end Ta are fixed faster than the other region closer to the intake-side distal end Tb, enabling to preclude the cylinder-side distal end Ta from being displaced with respect to the intake port 14.

Further, with the solidification of molten metal in the vicinity of the solidification promoter section "a" promoted, a gas-tightness is enhanced even in the presence of sand or resin films remaining somewhat in the both side edges Tc, thereby causing the tumble plate 100g to be reliably fixed.

This allows the cylinder head 10, as a cast product after completing the cast molding, to remarkably reduce the occurrence of looseness of the tumble plate 100g in the cast product.

Further, of the both side edges Tc, the solidification promoter section "a" is fixed faster and the flat and smooth section "b" is fixed relatively slower than the solidification promoter section "a". Consequently, it becomes possible for the direction, in which the tumble plate 100g thermally expands due to heat of molten metal, to be limited or controlled to one direction in which molten metal is directed from the solidification promoter section "a", at which molten metal begins to solidify, toward the flat and smooth section "b" where molten metal remains un-solidified.

Thus, with the tumble plate 100g having the regions, closer to the cylinder-side distal end Ta, previously fixed, it becomes possible for the direction in which the tumble plate 100g thermally expands to be limited to the direction toward the intake-side distal end Tb. The thermal expansion of the tumble plate 100g is caused to intensively occur at the intake-side distal end Tb that is liable to expand, and no probabilities occur for the port core 200g to be pressurized by the cylinder-side distal end Ta.

For this reason, no cracks or damages occur to an important region for forming the shape of the intake port 14.

Even in the presence of great thermal expansion occurring in the tumble plate 100g, the port core 200g is pressurized by the intake-side distal end Tb, enabling cracks, which would occur in the port core 200g, to be guided to or induced to the core print 201. Burrs resulting from such cracks of the port core 200g do not occur in the cylinder head 10, as a cast product, after completing the cast molding but occurs in a product-profile outside region. Accordingly, subsequent deburring work can be easily carried out, or no need arises for carrying out such troublesome work.

As set forth above, with the presently filed embodiment, even in the presence of thermal expansion of the tumble plate 100g, the tumble plate 100g can be precisely cast in with the locating position of the cylinder-side distal end Ta remaining in an important position.

Accordingly, the positional displacement of the tumble plate 100g or looseness inside the cast product are adequately minimized to achieve improvement in a product quality and, additionally, it becomes possible to cause the burrs, resulting from cracks of the port core 200g, to occur in limited regions for thereby providing an ease of deburring work in subsequent processing.

(Eighth Embodiment)

Next, an eighth embodiment according to the present invention is described.

FIGS. 21A and 21B are a schematic plan view and a schematic side view illustrating a port core 200h in which a tumble plate 100h of the presently filed embodiment is preliminarily set.

As shown in FIGS. 21A and 21B, the tumble plate 100h of the presently filed embodiment differs from the seventh embodiment in that partial regions (solidification promoter section "a") of the both side edges Tc, on which the promoter portions 120 are provided, have larger cast-in widths than the other region (flat and smooth section "b") of the both side edges Tc whereas in the seventh embodiment, the both side edges Tc have equalized cast-in widths. The other structure is similar to the seventh embodiment.

The cast-in widths may take various dimensions depending upon a thickness of a wall surface of the intake port 14 and a thickness of the tumble plate 100h and, to take one such example, for the flat and smooth section "b" with a cast-in width L1 lying in a value of approximately 2 mm, a cast-in width L2 of the solidification promoter section "a" is determined to lie in a value ranging from approximately 2.5 mm to 3 mm.

The presence of an increase in the cast-in width L2 of the solidification promoter section "a" increases a contact area with the cylinder head 10, i.e., with a body, permitting the solidification promoter section "a" to be firmly fixed and it becomes possible to further increase a locating precision of the cylinder-side distal end Ta, forming an important position, with respect to the intake port 14.

Further, with an increase in area subjected to heat of molten metal a temperature of the tumble plate 100h increases and, hence, the tumble plate 100h is enabled to extend far enough to a level available to absorb an increase in an extending length of the tumble plate 100h prior to he solidification of surrounding molten metal. This enables cracks or damages to the port core 200h to be prevented from occurring in a further reliable manner.

Incidentally, the both side edges Tc are possible to decrease the cast-in width as small as possible and, hence, even if the notch depth slightly increases due to the presence of a slight increase in the cast-in width like in the presently filed embodiment, it becomes possible to avoid factors for causing deterioration in a structural strength of the cylinder head 10.

(Ninth Embodiment)

Next, a ninth embodiment according to the present invention is described.

FIGS. 22A and 22B are a schematic plan view and a schematic side view illustrating a port core 200i in which a tumble plate 100i of the presently filed embodiment is preliminarily set.

As shown in FIGS. 22A and 22B, the tumble plate 100i of the presently filed embodiment differs from the seventh embodiment in that partial regions, in which the promoter portions 120 of the end faces 102, facing in the thickness direction, of the both side edges Tc are provided, are set closer to the intake-side distal end Tb whereas in the seventh embodiment, the partial regions in which the promoter portions 120 are provided are set closer to the cylinder-side distal end Ta. Other structure is similar to the seventh embodiment.

Depending upon structures of the intake ports 14 or types of fuel injection units, there are probabilities where the intake-side distal end Tb of the tumble plate 100i needs to be positioned at an increased locating precision. In such cases, it may be sufficed for the partial regions (solidification promoter section "a"), in which the promoter portions 120 are provided on the both side edges Tc, to be set closer to the intake-side distal end Tb.

With such a structure, a combination between the action for quenching molten metal through the promoter portions 120 and the action for causing molten metal to stay excels at promoting the solidification of molten metal in the vicinity of the solidification promoter section "a" further than the solidification of molten metal in the vicinity of the flat and smooth section "b". This allows the solidification promoter section "a" of the both side edges Tc to be fixed faster than the flat and smooth section "b", thereby regulating the locating position of the tumble plate 100i with respect to the intake port 14.

As set forth above, with the presently filed embodiment, the partial regions of the both side edges Tc closer to the intake-side distal end Tb are fixed faster than the other region closer to the cylinder-side distal end Ta, enabling the intake-side distal end Tb to be prevented from displacement with respect to the intake port 14.

Incidentally, while the above embodiments have been exemplarily presented with reference to structures where the partial regions, in which the locating precision of the tumble plate 100i is required, are set on the cylinder-side distal end Ta (in the seventh embodiment) and the intake-side distal end Tb (in the ninth embodiment), respectively, for other partial regions required to have an increased locating position, the promoter portions 120 may be located in such required partial regions. For the tumble plate 100i required to have an increased locating precision at a central region of the tumble plate 100i in a longitudinal direction thereof, the promoter portions 120 may be located in substantially central regions of the both side edges Tc along the longitudinal direction thereof.

(Tenth Embodiment)

Next, a tenth embodiment according to the present invention is described.

FIGS. 23A and 23B are a schematic plan view and a schematic side view illustrating a port core 200j in which a tumble plate 100j of the presently filed embodiment is preliminarily set.

As shown in FIGS. 23A and 23B, the tumble plate 100j of the presently filed embodiment differs from the seventh embodiment in that projections 122, 123, corresponding to members for promoting the solidification of molten metal, are provided on entire regions of the end faces 102, facing in the thickness direction, of the both side edges Tc on varying distribution patterns and the degree at which the solidification of molten metal is promoted by the above members 122,123 is varied in a longitudinal direction (to vary in a direction along the x-axis and extending in a direction along the y-axis) to allow the partial regions of the end faces 102, facing in the thickness direction, of the tumble plate 100j to be relatively or substantially formed with the promoter portions 120 for promoting the solidification of molten metal whereas in the seventh embodiment, the projections 121 are located in the specified regions. Other structure is similar to the seventh embodiment.

Depending upon structures of the intake ports 14, probabilities may occur where the both side edges Tc of the tumble plate 100j are required to be firmly fixed throughout a whole of the both side edges Tc along the longitudinal direction. In such cases, it may be sufficed for the projections 122, 123 to be formed over the entire regions, in the longitudinal direction, of the end faces 102 facing in the thickness direction. However, there is a difference between the locating precision required for the cylinder-side distal end Ta of the tumble plate 100j and the locating precision required for the intake-side distal end Tb and, in addition, there is a need for limiting or controlling a direction, in which the tumble plate 100j thermally expands due to heat of molten metal, to one direction.

With an exemplary structure shown in the drawing figures, the cylinder-side distal end Ta is required to have a higher locating precision than that of the intake-side distal end Tb and the projections 122 closer to the cylinder-side distal end Ta are placed in a locating density under a "dense" condition while the projections 123 closer to the intake-side distal end Tb are placed in a locating density under a "coarse" condition. The projections 122 (hereinafter referred to as "dense projections 122") whose locating density is "dense" relatively have larger effects of quenching molten metal and causing molten metal to stay than those of the projections 123 (hereinafter referred to as "coarse projections 123") whose locating density is "coarse".

Accordingly, even for the projections 122, 123 formed on the entire regions of the respective end faces 102 facing in the thickness direction, changing the locating densities of the projections 122, 123 results in an effect of relatively and substantially forming the promoter portions 120 in partial regions of the end faces 102, facing in the thickness direction, of the both side edges Tc. The regions in which the dense projections 122 are arranged constitute the solidification promoter section "a".

With such a structure, the provision of the projections 122, 123 formed on the entire regions, in the longitudinal direction, of the end faces 102 facing in the thickness direction enables the entire regions of the end faces, along the longitudinal direction, of the both side edges Tc to be firmly fixed. Additionally, such a structure promotes the solidification of molten metal in the vicinity of the dense projections 122, which function as the promoter portions 120, further than the solidification of molten metal in the vicinity of the coarse projections 123. This allows the both side edges Tc of the tumble plate 100j to excel at fixing the solidification promoter section "a", in which the dense projections 122 are provided, faster than the regions where the coarse projections 123 are located, thereby regulating the locating position of the tumble plate 100j with respect to the intake port 14.

As set forth above, with the presently filed embodiment, the both side edges Tc of the tumble plate 100j are effective to cause the regions closer to the cylinder-side distal end Ta to be fixed faster than those closer to the intake-side distal end Tb, enabling the cylinder-side distal end Ta to be prevented from displacement with respect to the intake port 14.

Further, a direction in which the tumble plate 100j thermally expands is limited to a direction toward the intake-side distal end Tb and no cracks or damage occur to an important region, of the tumble plate 100j, for forming the shape of the intake port 14.

Incidentally, the members for promoting the solidification of molten metal may be constituted by the projections 122, 123 described above and, in addition to these, concave portions, concave and convex portions and through-bores may be adopted.

Also, in order to vary the degree at which the solidification of molten metal is promoted, through the use of the members for promoting the solidification of molten metal, along the longitudinal direction, the projections 122, 123 may be located in varying densities as set forth above and, in addition to this, an alternative may include the form of a structure wherein a size (in diameter and height) and a locating position are varied depending upon the degree of required locating precision.

Still also, in order to vary the degree at which molten metal is solidified along the longitudinal direction of the tumble plate 100j, the tumble plate 100j may be formed in any one of a structure where the promoting degree is varied on two stages, another structure where the promoting degree is varied stepwise in more than three stages or the other structure where the promoting degree is continuously varied.

(Eleventh to Fourteenth Embodiments)

Next, eleventh to fourteenth embodiments according to the present invention are described.

FIGS. 24A and 24B, FIGS. 25A and 25B, FIGS. 26A and 26B and FIGS. 27A and 27B are schematic plan views and schematic side views illustrating port cores 200h to 200n in which tumble plates 100h to 100n of the eleventh to fourteenth embodiments are preliminarily set, respectively.

While the seventh embodiment have been described with reference to the promoter portions 120 constituted by the projections 122 formed on the end faces 102, facing in the thickness direction, of the both side edges Tc, suitable structures may be adopted as far as the solidification of molten metal is promoted and include concave portions, concave and convex portions or through-bores that are formed in the end faces 102, facing in the thickness direction, of the both side edges Tc. Also, the shape of the promoter portions 120 may not be limited to the columnar configuration, which is shown, and may include suitable configurations such as a cone shape, an angled shape, a pyramid shape, a triangular shape, a square shape, a round hole, a rectangular hole and a wire shape. The convex portions, the concave portions, concave and convex portions and through-bores may be suitably combined in a mixed status or different shapes may be combined in a mixed state. Additionally, the promoter portions 120 may be formed not only by press forming but also by known machining method such as laser forming, knurling, drilling and cutting.

In particular, the promoter portions 120 may be formed in the structures shown in the eleventh to fourteenth embodiments.

As shown in FIGS. 24A and 24B, with the eleventh embodiment, laser forming is conducted on the end faces 102, facing in the thickness direction, of a tumble plate 100k, thereby forming concave portions 124 in substantially cone shapes in cross section. The concave portions 124 formed in the substantially cone shapes are shown in a cross section in an enlarged region indicated by a lead line in FIG. 24B.

As shown in FIGS. 25A and 25B, with the twelfth embodiment, knurling is conducted on the end faces 102, facing in the thickness direction, of a tumble plate 100l, thereby forming cross-hatch-shaped concave and convex portions 125 over entire widthwise regions of respective cast-in widths of a tumble plate 100l. The cross-hatch-shaped concave and convex portions 125 are shown in a cross section in an enlarged region indicated by a lead line in FIG. 25B.

As shown in FIGS. 26A and 26B, with the thirteenth embodiment, drilling is conducted on the end faces 102, facing in the thickness direction, of a tumble plate 100m, thereby forming through-bores 126 in the form of round holes. The through-bores 126, made of round holes, are shown in a cross section in an enlarged region indicated by a lead line in FIG. 26B.

As shown in FIGS. 27A and 27B, with the fourteenth embodiment, laser forming or cutting are conducted on the end faces 102, facing in the thickness direction, of a tumble plate 100n, thereby forming concave portions 127 formed in recesses shaped in line segments. The concave portions 127, formed in the recesses shaped in the line segments, are shown in a cross section in an enlarged region indicated by a lead line in FIG. 27B.

(Fifteenth Embodiment)

Next, a fifteenth embodiment according to the present invention is described.

FIGS. 28A and 28B are plan views illustrating tumble plates 100o, 100p of the presently filed embodiment, respectively.

As set forth above, since the port core 200 is formed by blowing core sand with the tumble plate 100 preliminarily set in the core mold 300, it is probable for the shape and cast-in widths of the left and right sides Tc of the tumble plate 100 to be differentiated on consideration of a flow behavior of molten metal. Thus, for the tumble plate 100 with distinction between the both sides thereof, on forming the port core 200, there is a need for placing the tumble plate 100 in the core mold 300 with the both sides matched in correct orientations.

In such cases, like in the presently filed embodiment, a notch 128 may be formed on a corner of the tumble plate 100o (see FIG. 28A) or the projections 122 forming the promoter portions 120 may be located in non-symmetric positions on left and right sides Tc (see FIG. 28B) for the purpose of preventing setting mistakes in placing the tumble plates 100o, 100p in the core mold 300.

(Sixteenth Embodiment)

Next, a sixteenth embodiment according to the present invention is described.

FIGS. 29A and 29B are a schematic plan view and a schematic side view illustrating a port core 200q in which a tumble plate 100q of the presently filed embodiment is preliminarily set.

As shown in FIGS. 29A and 29B, the tumble plate 100q of the presently filed embodiment differs from the seventh embodiment in that the both side edges Tc of the tumble plate 100q have side end faces 101 that are additionally provided with other promoter portions 110 for promoting the solidification of molten metal whereas in the seventh embodiment, the promoter portions 120 are provided on only the end faces 102, facing in the thickness direction, of the tumble plate. Other structure is similar to the seventh embodiment.

With variation in wall thickness of the cylinder head 10 and avoidance of stress concentration in mind, it may be effective to take a structure wherein the promoter portions 120 formed on the end faces 102, facing in the thickness direction, of the both side edges Tc and the other promoter portions 110 provided on the side end faces 101 of the both side edges Tc are combined in use. In such a structure, with the presently filed embodiment, the promoter portions 120 are provided on the end faces 102, facing in the thickness direction, of the both side edges Tc, while the other promoter portions 110 are provided on the side end faces 101 of the both side edges Tc. The other promoter portions 110 may be constituted by at least one of the concave portions 111 formed on the side end faces 101 of the both side edges Tc, convex portions and concave and convex portions.

For example, the other promoter portions 110, constituted by the concave portions 111 formed on the side end faces 101, excel both at action for quenching molten metal and action for causing molten metal to stay like the promoter portions 120 constituted by the projections 121, exhibiting a function to promote the solidification of molten metal in the vicinity of the solidification promoter section "a" further than the solidification of molten metal in the vicinity of the flat and smooth section "b".

With the side end faces 101 formed with the other promoter portions 110 at the respective partial regions of the tumble plate 100q, cast-in widths of such partial regions are slightly larger than those of the regions of the end faces 102 facing in the thickness direction, where the promoter portions 120 are provided, and as viewed from the cylinder head 10, a notch depth slightly increases. With such a view in mind, it may not be preferable for the regions, in which stress concentration is to be avoided, and the regions, in which the cylinder head 10 has a reduced wall thickness, to have the other promoter portions 110 on the side end faces 101. However, for the regions where the wall thickness is large, even if the notch depth slightly increases, no factor is caused for deteriorating the structural strength of the cylinder head 10 and, rather, a contact area with molten metal increases, resulting in an effect of promoting the cooling of molten metal at the region where the wall thickness is large.

With the presently filed embodiment, on consideration of the above view, the use in a combination between the promoter portions 120 to be formed on the end faces 102 facing in the thickness direction and the other promoter portions 110 to be formed on the side end faces 101 is determined in a manner as described below. First, for regions closer to the cylinder-side distal end Ta in a downstream side where a relatively high degree of locating precision is required, the cylinder head 10 has an increased wall thickness and, hence, the side end faces 101 are formed with the promoter portions 110. Moreover, for regions closer proximity to head bolts 129 at which stress concentration is to be avoided, the end faces 102 facing in the thickness direction are formed with the promoter portions 120 in the form of the projections 121 that are located at narrow intervals (in the "dense" locating density). Additionally, for the regions closer to the intake-side distal end Tb in the upstream side where a relatively low locating precision is required, the cylinder head 10 has a reduced wall thickness and, hence, the end faces 102 facing in the thickness direction are formed with the promoter portions 120 in the form of the projections 121 that are located at wide intervals (in the "coarse" locating density).

As set forth above, with the presently filed embodiment, it becomes possible to easily take a measure to count variation in wall thickness of the cylinder head 10 and avoidance of stress concentration.

(Seventeenth Embodiment)

Next, a seventeenth embodiment according to the present invention is described.

Figure 30A:
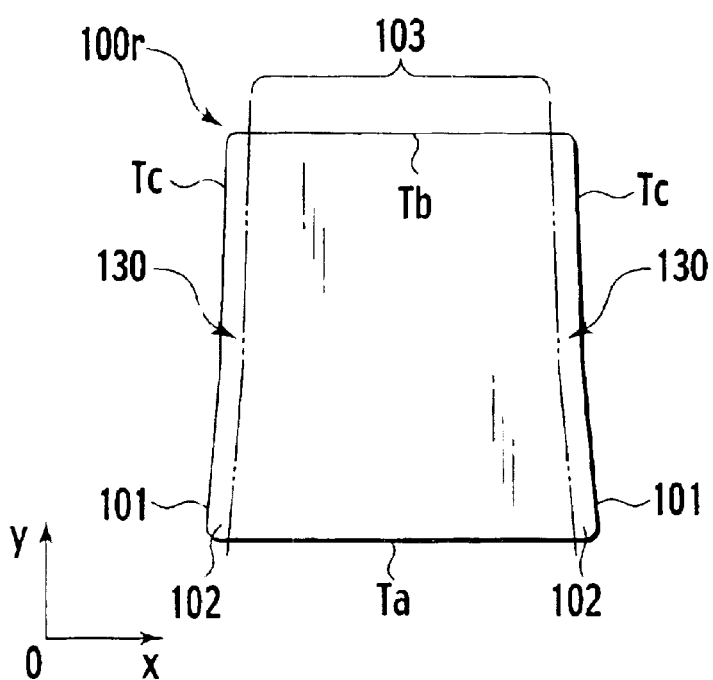
FIG. 30A is a plan view illustrating a tumble plate of a seventeenth embodiment according to the present invention.
Figure 30B:
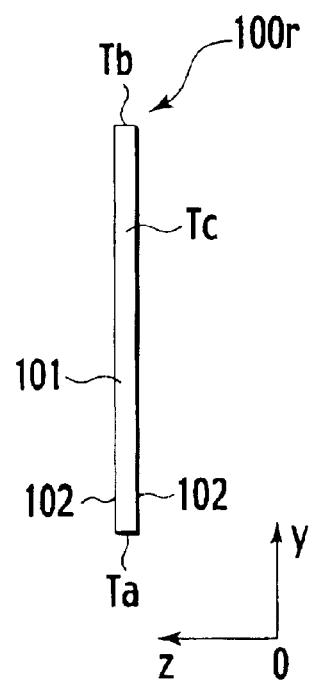
FIG. 30B is a side view of the tumble plate shown in FIG. 30A.
Figure 30C:
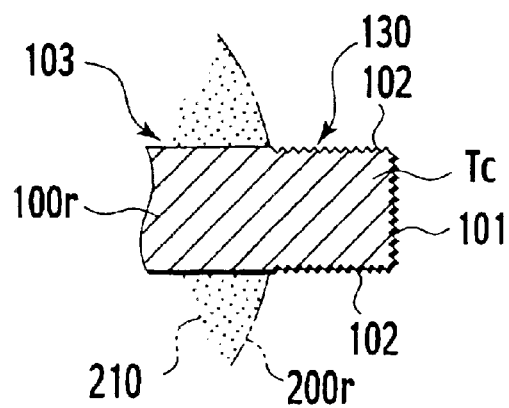
FIG. 30C is a schematic enlarged view of side edges of the tumble plate of the presently filed embodiment.

FIGS. 30A to 30C are a plan view and a side view illustrating a tumble plate 100r of the presently filed embodiment, and a schematic enlarged view of one of side edge portions Tc.

For the cylinder head 10 as a cast product after completing the casting, it is important for the tumble plate 100r to have no looseness inside the cast product. This is because when used as an engine, the presence of looseness of the tumble plate 100r results in disturbance in tumble flow and causes noises and vibrations. Although the presence of the tumble plate 100, whose side edges Tc are fused to the cylinder head 100, enables looseness of the tumble plate 100r to be avoided, it is conceivable for a fatigue strength of the tumble plate 100r to be adversely affected and there is a need for realizing a structure except one in which the both side edges Tc are fused to the cylinder head 10.

Further, with cost factors in mind, although it is preferable for the tumble plate to be formed of a press-formed product, there are probabilities where lubricating oil films or other contaminants resulting from press forming adhere onto the both side edges Tc, and such surface contaminants cause factors for facilitating a clearance between the both side edges Tc and a wall portion of the cylinder head 10. This results in the occurrence of looseness of the tumble plate along a longitudinal direction and a vertical direction, resulting in the occurrence of clearance in the order of approximately 1/10 mm.

Therefore, with the presently filed embodiment, in cast molding the cylinder head 10, a structure is employed wherein the both side edges Tc are made in coarse surfaces while simultaneously removing the surface contaminants and even with a structure where the both side edges Tc are not fused to the cylinder head 10, the tumble plate 100r is enabled to have an increased gripping force.

In particular, as shown in FIGS. 30A and 30B, the tumble plate 100r has a substantially square shape and is comprised of the both side edges Tc that are cast in by molten metal in cast molding the cylinder head 10, the intake-side distal end Tb that is continuous with the both side edges Tc and located upstream of intake air flow in the intake port 14, and the cylinder-side distal end Ta that is continuous with the both side edges Tc and located downstream of intake air flow in the intake port 14.

More particularly, as shown in FIG. 30C, the tumble plate 100r differs from the seventh embodiment in that surface treatment is conducted on the tumble plate 100r at the both side edges Tc to be cast in by molten metal to cause the both side edges Tc to be finished in a coarser roughness than a coarse surface of the partitioning section 103 by which the intake port 14 is partitioned. Other structure is similar to the seventh embodiment.

The coarse surface treatment is conducted on the side end faces 101 of the end faces 102 facing in thickness direction of the both side edges Tc. Incidentally, in the following description, an intake-port forming sand core 200r in which the tumble plate 100r is preliminarily set, is also referred to as a "port core 200r" and a region that is treated in a coarse surface is also referred to as a "coarse surface section".

With a reduction in weight and recycling capability in mind, the tumble plate 100r may be preferably made of material such as aluminum alloy.

Although it is preferable for the tumble plate 100r to have a thin plate thickness not to provide resistance for intake air to flow across the intake port 14, the tumble plate 100r, made of material such as aluminum alloy, may preferably have a thickness of a value equal to or greater than approximately 1.5 mm in consideration of a need for precluding thermal deformation occurring during heat treatment of a cast product as the cylinder head 10.

The presently filed embodiment takes the form of a structure wherein surface treatment is conducted on the both side edges Tc to cause the both side edges Tc to be treated in a rough surface to have coarse surface portions 130, and it is preferable for the both side edges Tc to have coarser surface roughness than that of the partitioning section 103. This is because such a structure prevents disturbance in tumble flow and enables to minimize the occurrence of looseness of the tumble plate 100r.

Although no particular limitation is intended for a method of surface treating the both side edges Tc in the coarse surfaces, examples of such method may include mechanical blasting method and chemical corrosion treatment. The blasting method may include sand shot blasting and steel shot blasting and corrosion treatment may include corrosion treatment using sodium hydroxide.

A manufacturing method of the tumble plate 100r is not particularly limited and in view of simply fabricating products in identical quality at low costs, the tumble plate 100r may be fabricated by press forming. Although there are probabilities where lubricating oil films or other contaminants adhere to the tumble plate 100r on pressing step, the presently filed embodiment allows surface treatment to be conducted on the tumble plate 100r after pressing step, thereby simultaneously removing surface contaminants from the both side edges Tc. With the surface contaminants removed, the use of a pressed product as the tumble plate 100r excludes the factors for facilitating the clearance between the both side edges Tc and the cylinder head 10.

Figure 31A:
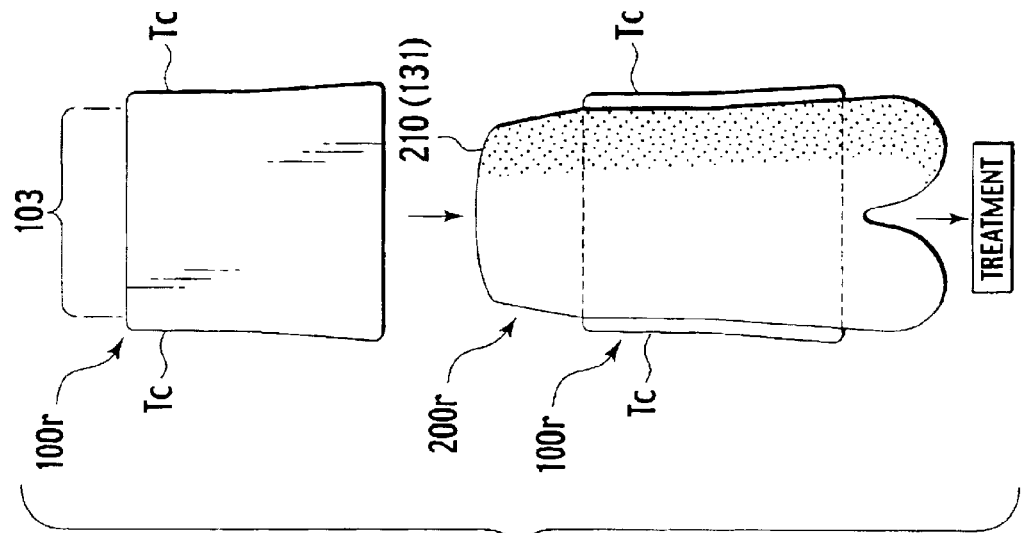
FIG. 31A is a view illustrating a procedure in which surface treatment is carried out on the both side edges prior to molding the port core of the presently filed embodiment.
Figure 31B:
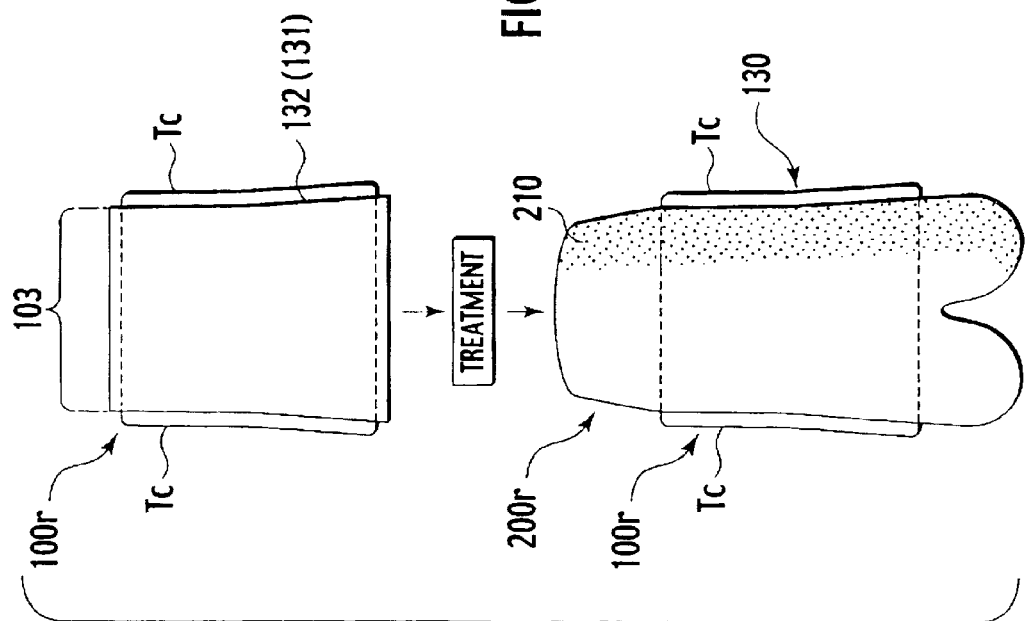
FIG. 31B is a view illustrating a procedure in which surface treatment is carried out on the both side edges subsequent to molding the port core of the presently filed embodiment.

FIGS. 31A and 31B are views illustrating procedures on which surface treatment is carried out. FIG. 31A shows a case where surface treatment is conducted on the both side edges Tc prior to molding the port core 200r, and FIG. 31B shows a case where surface treatment is conducted on the both side edges Tc subsequent to the port core 200r being molded.

That is, surface treatment may be carried out on the both side edges Tc prior to molding the port core 200r as shown in FIG. 31A and may be carried out subsequent to the port core 200r being molded.

In any cases, surface treatment may be preferably conducted by setting a masking 131 on the partitioning section 103. This is because no minute surface roughness, i.e., a smoothness of the partitioning section 103 is deteriorated to prevent the occurrence of disturbance in tumble flow while permitting only the both side edges Tc, serving as the cast-in portions, to have enlarged roughness, enabling to minimize the occurrence of looseness of the tumble plate 100r.

Here, the masking 131 may be constituted of a masking material 132 or core sand 210 by which the port core 200r is formed.

In particular, when carrying out surface treatment prior to molding the port core 200r as shown in FIG. 31A, the partitioning section 130 is masked with the masking material 132 as the masking 131, thereby enabling surface treatment to be carried out only on the both side edges Tc. Locating the masking material 132 on the partitioning section 103 and carrying out shot blasting with the both side edges Tc being exposed enables the both side edges Tc to have coarse surface roughness while ensuring the partitioning section 103 to have a surface roughness at a low degree. On carrying out surface treatment, such as sand shot blasting or steel shot blasting, onto a whole of the tumble plate 100, the surface roughness of the partitioning section 103 becomes coarse in excess with a resultant disturbance in tumble flow and, hence, surface treatment may be effectively carried out on the partial regions using the masking material 132. With such surface treatment conducted, the port core 200r is molded as shown in the lowest stage in FIG. 31A.

Further, as shown in FIG. 31B, in conducting surface treatment on the tumble plate 100r subsequent to molding the port core 200r, surface treatment can be conducted only for the both side edges Tc protruding outward from the port core 200r in the first place. Consequently, the masking 131 is constituted by core sand 210 per se by which the port core 200 is molded. That is, as shown in an upper stage and a middle stage, the partitioning section 103 is masked by core sand 210 serving as the masking material 131, enabling surface treatment to be conducted only for the both side edges Tc. On carrying out corrosion treatment using a brush to apply corrosion liquid, such as sodium hydroxide, onto the both side edges Tc, the both sided edges Tc are enabled to have enlarged surface roughness while permitting the partitioning section 103 to have a low surface roughness. On conducting surface treatment in such a way, a volume of corrosion liquid to be used in surface treatment can be saved and, in addition, corrosion reaction is facilitated due to residual heat resulting from the cast molding of the port core 200, providing an advantage of shortening a time interval required for surface treatment.

Figure 34:
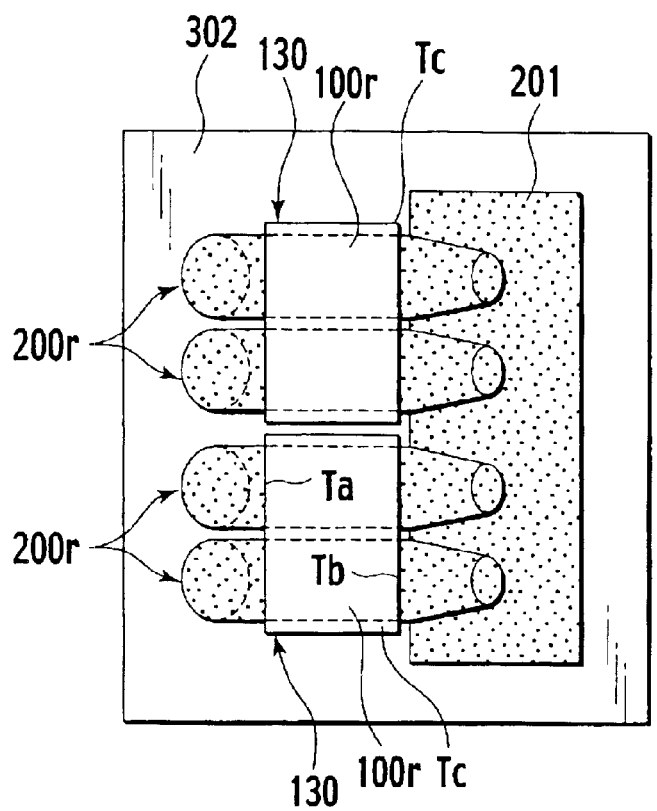
FIG. 34 is a schematic plan view illustrating the mold, for molding the port core of the presently filed embodiment, which is broken away to expose the tumble plate.

FIGS. 32A and 32B are a schematic plan view and a schematic side view illustrating the port core 200r in which the tumble plate 100r is preliminarily set. Also, FIG. 33 is schematic cross sectional view illustrating a mold 300r for molding the port core 200r, and FIG. 34 is a plan view illustrating a condition where the mold 300r for molding the port core 200r is cut away to expose the tumble plate 100r. Also, in the following description, the mold 300 for molding the port core 200r is also referred to as a "core mold 300r".

In casting the cylinder head 10, first, the core mold 300r is used, thereby molding the port core 200r as shown in FIGS. 32A and 32B.

The port core 200r is set in a casting mold 400r (see FIG. 35) by which the cylinder head 10 is cast, thereby forming the intake port 14 of the cylinder head 10. The above-described tumble plate 100r is preliminarily set in the port core 200r such that the both side edges Tc, which have the coarse surface portions 130, of the tumble plate 100r is preliminarily set in the port core 200r such that the both side edges Tc protrude outward to be cast in by molten metal.

The both side edges Tc, protruding outward, of the tumble plate 100r serve as portions to allow the both side edges Tc, which are cast in by molten metal, to be reliably held. No particular limitation is intended to the cast-in widths of the tumble plate 100r and the cast-in widths may preferably lie in a value of approximately 2 mm.

As shown in FIG. 34, with the tumble plate 100r preliminarily set in the core mold 300r, core sand is blown into a mold cavity, thereby forming the port core 200r. The tumble plate 100r is positioned in a manner not to cause displacement in the core mold 200r and is set on a rest formed on a mold parting surface of the core mold 300r. That is, the tumble plate 100r is retained under a condition where it is placed in a circumferential edge of the mold cavity.

Separating the mold segments, such as the core-forming upper half 301 and the lower half mold 302, in a separating direction as shown by an arrow S in FIG. 33 allows the port core 200r, formed in the core mold 300r, to be taken out from the core mold 300r.

Figure 35:
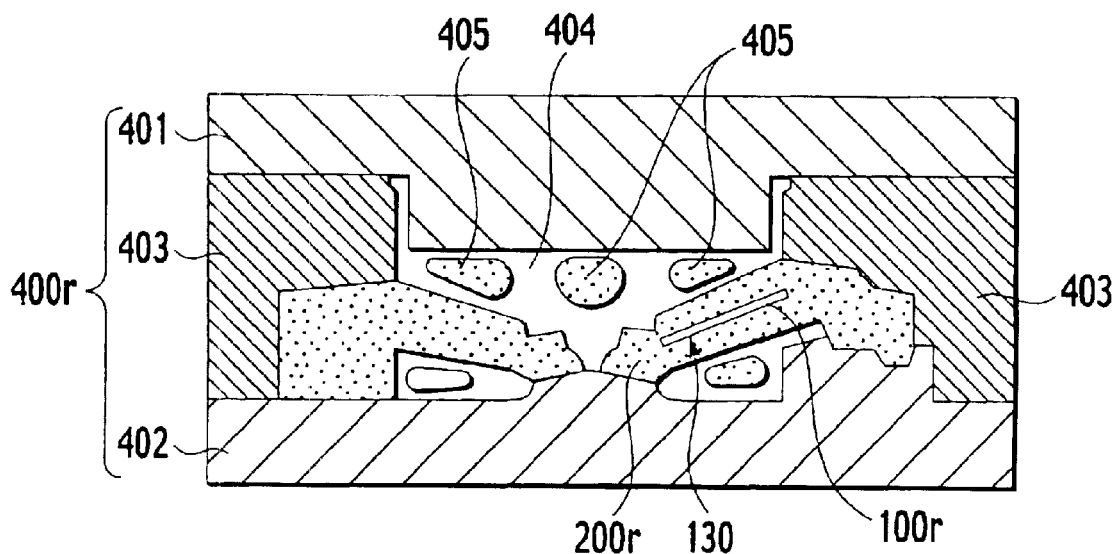
FIG. 35 is a schematic cross sectional view illustrating a casting mold, for cast molding the cylinder head of the presently filed embodiment, under a condition in which the port core is set.

FIG. 35 is a cross sectional view illustrating a condition where the port core 200r is set in the casting mold 400r by which the cylinder head 10 is cast molded.

As shown in FIG. 35, the port core 200r is set in the casting mold 400r for forming the cylinder head 10. Under such a condition, pouring molten metal, such as aluminum alloy, into the mold cavity 400r through the in-gate (not shown) allows the both side edges Tc of the tumble plate 100r to be progressively cast in whereupon with molten metal solidified, a whole of the both side edges Tc is fixed.

On completing the cast molding, the cores, such as the port core 200 are removed, thereby obtaining the cylinder head 10 as a cast product.

Thus, surface treating the both side edges Tc of the tumble plate 100r to be cast in by molten metal removes the contaminants, remaining on the surfaces of the both side edges Tc of the tumble plate 100r that is formed of a press-formed product, while providing the coarse surface portions 130 with the surface roughness coarser than that of the partitioning section 103. Consequently, even under a condition where the both side edges Tc of the tumble plate 100r are not fused to the cylinder head 14, a large number of minute engaging portions are created between the roughened both side edges Tc and solidified molten metal, resulting in an increase in a gripping force of the tumble plate 100r to cause the tumble plate 100r to be reliably fixed in place. This allows suppression of the occurrence of looseness of the tumble plate 100r with respect to the intake port 14 in the cylinder head 10 as the cast product subsequent to completing the cast molding.

That is, even under a condition where the both side edges Tc of the tumble plate 100r are not fused to the cylinder head 10, the both side edges Tc can be cast in at a high precision. Accordingly, this enables remarkable improvement in looseness of the tumble plate 100r in the cast product thereby to achieve improvement in a product quality.

Figure 36A:
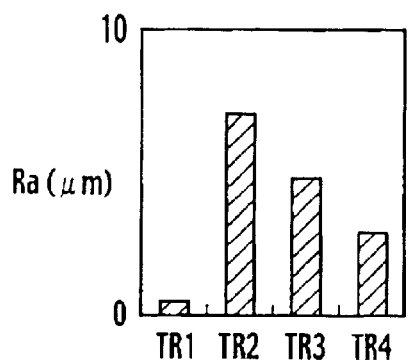
FIG. 36A is a graph illustrating results of surface roughness obtained by carrying out steel shot blasting, sand shot blasting and corroding through sodium hydroxide, respectively, in comparison with a surface roughness with non-treatment, i.e., surface roughness in a pressed product.
Figure 36B:
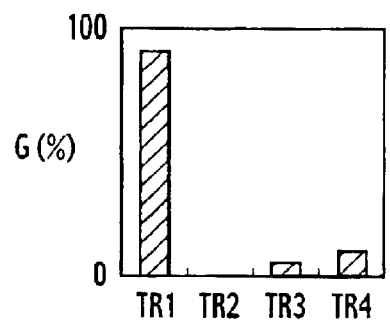
FIG. 36B is a graph illustrating results of looseness generating rates of the tumble plates obtained by carrying out steel shot blasting, sand shot blasting and corroding through sodium hydroxide, respectively, in comparison with a looseness generating rate of the tumble plate with non-treatment, i.e., the tumble plate remaining in a press formed condition.

FIG. 36A is a graph plotting results of surface treatment, by which the both side edges Tc are surface treated, for illustrating surface roughness Ra (μm) resulting from sand shot blasting and corrosion using sodium hydroxide in comparison with a surface roughness on non-treatment, i.e., with surface roughness Ra (μm) of a press-formed product, and FIG. 36B is a graph illustrating looseness generating rate g (%) of the tumble plate 100r with the surface treatment is carried out by sand shot blasting and corrosion, using sodium hydroxide, in comparison with a surface roughness on non-treatment, i.e., with looseness generating rate g (%) of the press-formed product with non-treatment. Incidentally, in FIG. 36A, the surface roughness Ra is indicated in an arithmetic average roughness. Moreover, in FIGS. 36A and 36B, TR1 designates a result of non-treatment with the pressed surface remaining unchanged, TR2 a result of treatment with steel shot blasting, TR3 a result of treatment with sand shot blasting, and TR4 a result of corrosion treatment with sodium hydroxide.

As shown in FIG. 36A, the surface roughness varies depending upon the treatment methods and it is clear that steel shot blasting TR2 is an effective treatment for providing coarse surface roughness. Further, as shown in FIG. 36B, the looseness generating rate of the tumble plate 100r depends on the surface roughness of the both side edges Tc, and any one of surface treatments TR2 to Tr4 is effective to remarkably reduce looseness as compared to non-treatment TR1. Although it is understood that the coarser the surface roughness, the more effective to prevent looseness of the tumble plate 100r, with surface treatment conducted by sand shot blasting, no generation of looseness was found.

Incidentally, for the clearance generating between the side edges Tc and the wall of the cylinder head 10 in a specific range along the longitudinal direction of the side edges Tc to cause the occurrence of looseness of the tumble plate 100r, the surface treatment may be conducted only on partial regions of the side edges Tc at positions corresponding to the specific range. Furthermore, with the whole of the side edges Tc treated in a coarse surface, the partial regions corresponding to the specific range may be treated in a coarser surface. In order for the surface roughness to vary along the longitudinal direction, it may be sufficed to change time for which sand shot blasting is conducted and time for which corrosion liquid applied to the surface is left. That is, a surface treatment time interval may be varied along the longitudinal direction, or a diameter of shot materials, the amount of shot material to be applied and a concentration of corrosion liquid to be applied may be varied along the longitudinal direction.

Moreover, for the surface roughness to vary along the longitudinal direction, it may be possible to adopt any of technique of providing variation between two surface roughness stages, technique of providing stepwise variation in more than three surface roughness stages and technique of continuously varying the surface roughness.

(Eighteenth Embodiment)

Next, an eighteenth embodiment according to the present invention is described.

Figure 37A:
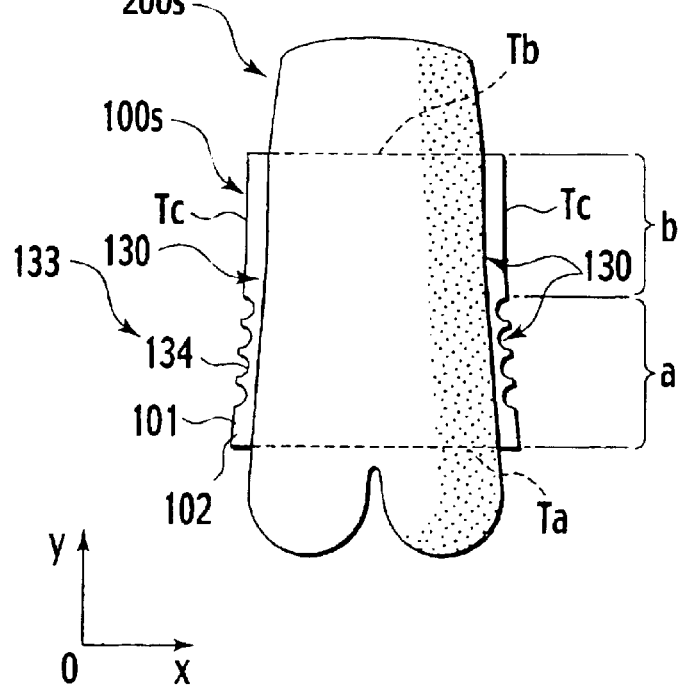
FIG. 37A is a schematic plan view illustrating a port core in which a tumble plate, of an eighteenth embodiment according to the present invention, is preliminarily set.
Figure 37B:
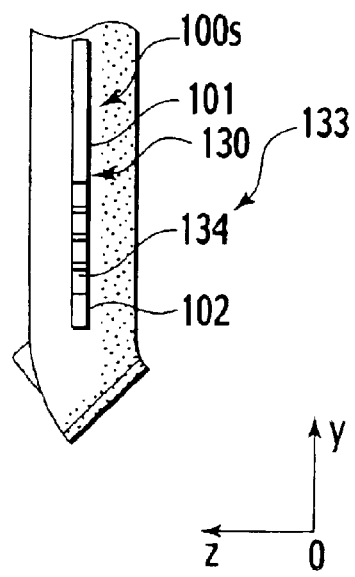
FIG. 37B is a schematic cross sectional view of the port core shown in FIG. 37A.

FIGS. 37A and 37B are a schematic plan view and a schematic side view illustrating a port core 200s in which a tumble plate 100s of the presently filed embodiment is preliminarily set.

As shown in FIGS. 37A and 37B, the tumble plate 100s of the presently filed embodiment differs from the seventeenth embodiment in that the both side edges Tc further includes the promoter portions 133, for promoting the solidification of molten metal, whose surfaces are made coarse. Other structure is similar to the seventeenth embodiment.

As set forth above, the locating position of the cylinder-side distal end Ta of the tumble plate 100s serves as an important position because of intensive influence on a generating status of tumbles flow. With such a view in mind, the presently filed embodiment takes the form of a structure wherein, for the cylinder head 10 to be cast, the locating position of the cylinder-side distal end Ta of the tumble plate 100s is fixed while the locating position of the intake-side distal end Tb is made relatively free. Even with the tumble plate 100s subjected to thermal affects during the pouring of molten metal, the thermal affects can be absorbed at the intake-side distal end Tb.

More particularly, the promoter portions 133 are provided in limited partial regions of the side end faces 101 on the both side edges Tc and with the presently filed embodiment, such partial regions are made closer to the cylinder-side distal end Ta. The promoter portions 133 are comprised of concave portions 134 formed on the respective side end faces 101 on the both side edges Tc. The concave portions 134 have respective inner side surfaces, which are surface treated to form coarse surface portions 130, respectively, and the concave portions 134 are shown in respective semicircular arc shapes in the illustrated example. Incidentally, it is needless to say that for the concave portions 134 forming the promoter portions 133, a size, the number of pieces, locating positions and locating densities of the respective indent configurations may be altered in consideration of a locating precision required to the tumble plate 100s and the amount of thermal expansion of the tumble plate 100s.

Incidentally, for conveniences of description, of the both side edges Tc on the tumble plate 100s, the partial regions in which the promoter portions 133 are provided are also referred to as the solidification promoter section "a" and the other region with no provision of the promoter portions 133 is also referred to as the "non-located portion b".

The promoter portions 133 serve as a key to regulate the locating position of the tumble plate 100s with respect to the intake port 14 by promoting the solidification of molten metal in the vicinity of the partial regions (solidification promoter section "a"), in which the promoter portions 133 are provided, further than the solidification of molten metal in the vicinity of the other region (non-located section "b" as f).

Thus, on setting the port core 200s, in which the tumble plate 100s with the promoter portions 133 is preliminarily set, into the casting mold, like in the seventeenth embodiment, and pouring molten metal into the mold cavity 404, the both side edges Tc of the tumble plate 100s are progressively cast in and on solidifying molten metal, a whole of the both side edges Tc is fixed.

Here, the solidification promoter section "a", closer to the cylinder-side distal end Ta of the both side edges Tc, has a larger area with molten metal than that of the non-treated section "b" due to the presence of the concave portions 134. Consequently, when the both side edges Tc of the tumble plate 100s are cast in, molten metal in the vicinity of the solidification promoter section "a" is relatively quenched as compared to molten metal in the vicinity of the non-located section "b", thereby promoting the solidification of molten metal. Additionally, the presence of the concave portions 134 causes an increase in flow resistance occurring when molten metal flows and molten metal in the vicinity of the solidification promoter section "a" is apt to relatively stay as compared to molten metal in the vicinity of the non-located section "b", thereby promoting the solidification of molten metal.

Thus, with a combination between the action for quenching molten metal through the promoter portions 133 and the action for causing molten metal to stay, the solidification of molten metal in the vicinity of the solidification promoter section "a" is promoted further than the solidification of molten metal in the vicinity of the non-located section "b". This allows the solidification promoter section "a" of the both sides edges Tc to be fixed faster than the non-located section "b", thereby regulating the locating position of the tumble plate 100s with respect to the intake port 14. Moreover, the presence of the concave portions 134 increases resistance of the tumble plate 100s occurring when the tumble plate 100s tends to move under a semi-solidified condition. With such a view in mind, the tumble plate 100s is hard to move, thereby preventing the tumble plate 100s from being displaced. That is, the regions closer to the cylinder-side distal end Ta of the both sides edges Tc are fixed faster than the other region closer to the intake-side distal end Tb, enabling to prevent the positional displacement of the cylinder-side distal end Ta with respect to the intake port 14.

Further, the solidification of molten metal in the vicinity of the solidification promoter section "a" is promoted and the promoter portions 133 are provided with the coarse surface portions 130 whose contaminants remaining on the surfaces of the promoter portions 133 are removed. Thus, even under a condition where the both side edges Tc of the tumble plate 100s are not fused to the cylinder head 10, a large number of engaging portions are created between not only the side end faces 101 and the end faces 102 facing in the thickness direction but also the promoter portions 133, provided with the respective coarse surfaces, of the both side edges Tc and molten metal, resulting in a further increase in a gripping force of the tumble plate 100s to cause the tumble plate 100s to be fixed in a further reliable manner. This further suppresses the occurrence of looseness of the tumble plate 100s with respect to the intake port 14.

Furthermore, of the both sides edges Tc, the solidification promoter section "a" is previously fixed as set forth above, and the non-located section "b" is fixed relatively slower than the solidification promoter section "a". For this reason, it becomes possible to limit or control a direction, in which the tumble plate 100s thermally expands due to heat of molten metal, to one direction in which molten metal is directed from the solidification section "a", where molten metal begins to be solidified, toward the non-located section "b" where molten metal still remains un-solidified. That is, since the tumble plate 100s has the regions, closer to the cylinder-side distal end Ta, which is fixed faster, it becomes possible for the direction in which the tumble plate 100s thermally expands to a direction directed to the intake-side distal end Tb. Since the thermal expansion of the tumble plate 100s is concentrated at the intake-side distal end Tb where it is apt to expand, no pressure is applied to the port core 200s by the cylinder-side distal end Ta. Consequently, no probabilities occur for cracks or damages to takes place in an important region for forming the shape of the intake port 14.

Even if large thermal expansion takes place in the tumble plate 100s, the intake side distal end Tb pressurizes the port core 200s and cracks, which would occur in the port core 200s, can be guided to or induced to the core print. That is, burrs resulting from the cracks in the port core 200s do not occur in an inside of the cylinder head 14 as a cast product after completing the cast molding but takes place in the product-profile outside region. Accordingly, subsequent deburring work can be easily carried out.

As set forth above, with the presently filed embodiment, even if thermal expansion takes place in the tumble plate 100s, the tumble plate 100s can be precisely cast in with the cylinder-side distal end Ta kept in an important position.

Accordingly, in addition to the same advantage as that of the seventeenth embodiment in precluding looseness of the tumble plate 100s, another advantage is provided with an ability of totally improving a locating precision of the tumble plate 100s and breaking of the port core 200s.

Incidentally, depending upon structures of intake ports or types of fuel injection units, it is probable for the locating precision of the intake side distal end Tb of the tumble plate 100s to be increased in need. In such cases, locating the promoter portions 133, for promoting the solidification of molten metal, in regions closer to the intake-side distal end Tb enables a locating precision of the intake-side distal end Tb to be increased. Moreover, the promoter portions 133 may be located in the end faces 102, facing in the thickness direction, of the both side edges Tc. Besides, the promoter portions 133 may take the form of suitable structures and shapes as far as the solidification of molten metal is promoted and may include convex portions, concave and convex portions and through-bores.

The entire content of a Patent Application No. TOKUGAN 2003-359931 with a filing date of Oct. 20, 2003 in Japan, that of a Patent Application No. TOKUGAN 2003-359934 with a filing date of Oct. 20, 2003 in Japan and that of a Patent Application No. TOKUGAN 2003-359940 with a filing date of Oct. 20, 2003 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A partition plate, for an intake port of a cylinder head to be manufactured by cast molding, which is preliminarily set prior to the cast molding in a sand core applied to form the intake port and then cast in when the cast molding is conducted so as to partition the intake port into a plurality of ports, comprising:
   an intake-side distal end;
   a cylinder-side distal end;
   a pair of side edges continuous with the intake-side distal end and the cylinder-side distal end and to be cast in by molten metal when cast molding is conducted, each of the pair of side edges having end faces facing in a thickness direction and a side end face continuous with the end faces; and
   a promoter section including at least one of a plurality of projections, a plurality of indentations, and a plurality of through-bores, wherein the plurality of projections, the plurality of indentations, and the plurality of through-bores are provided on at least one of the side end face and the end faces of each of the pair of side edges to promote solidification of the molten metal.

2. The partition plate according to claim 1, wherein the promoter section is provided on a partial region of the side end face.

3. The partition plate according to claim 2, wherein the promoter section is closer to the cylinder-side distal end.

4. The partition plate according to claim 2, wherein the promoter section is closer to the intake-side distal end.

5. The partition plate according to claim 1, wherein the promoter section includes at least one of concave portions, convex portions, concave and convex portions and through-bore portions.

6. The partition plate according to claim 1, wherein the promoter section has a cast-in width greater than a cast-in width of a remaining portion of each of the pair of side edges.

7. The partition plate according to claim 1, wherein the promoter section is provided over entire regions of the side end face.

8. The partition plate according to claim 7, wherein the promoter section is configured to vary a degree, at which the solidification of the molten metal is promoted, along a longitudinal direction of the side end face.

9. The partition plate according to claim 1, wherein the promoter section is provided on the side end face and the end faces of the thickness direction.

10. A cylinder head adapted to be manufactured by cast molding, comprising:
    a cylinder bore;
    an intake port connected to the cylinder bore; and
    a partition plate that is preliminarily set, prior to cast molding, in a sand core applied to form the intake port and then cast in when the cast molding is conducted so as to partition the intake port into a plurality of ports, the partition plate being provided with:
    an intake-side distal end;
    a cylinder-side distal end;
    a pair of side edges continuous with the intake-side distal end and the cylinder-side distal end and to be cast in by molten metal when cast molding is conducted, each of the pair of side edges having end faces facing in a thickness direction and a side end face continuous with the end faces; and
    a promoter section including at least one of a plurality of projections, a plurality of indentations, and a plurality of through-bores, wherein the plurality of projections, the plurality of indentations, and the plurality of through-bores are provided on at least one of the side end face and the end faces of each of the pair of side edges to promote solidification of the molten metal.

11. The cylinder head according to claim 10, wherein the cylinder-side distal end of the partition plate promotes the solidification of the molten metal at the promoter section to be set to a position with no interference with at least one of a fuel injection region and a valve actuation region.

12. A method of manufacturing a cylinder head having a partition plate for an intake port, comprising:
    preparing a partition plate including an intake-side distal end, a cylinder-side distal end, a pair of side edges continuous with the intake-side distal end and the cylinder-side distal end to be cast in by molten metal when cast molding is conducted, and a promoter section including at least one of a plurality of projections, a plurality of indentations, and a plurality of through-bores, wherein the plurality of projections, the plurality of indentations, and the plurality of through-bores are provided on at least one of end faces, facing in a thickness direction, and a side end face, continuous with the end faces, of each of the pair of side edges to promote solidification of the molten metal;
    setting the partition plate in a sand core applied to form an intake port such that each of the pair of side edges is exposed outside;
    supplying molten metal onto each of the pair of side edges of the partition plate;
    solidifying the molten metal while promoting the solidification of the molten metal with the promoter section; and
    removing the sand core.

13. A partition plate, for an intake port of a cylinder head adapted to be manufactured by cast molding, which is preliminarily set, prior to the cast molding, in a sand core applied to form the intake port and then cast in when the cast molding is conducted so as to partition the intake port into a plurality of ports, comprising:
    an intake-side distal end;
    a cylinder-side distal end;
    a pair of side edges continuous with the intake-side distal end and the cylinder-side distal end and to be cast in by molten metal when cast molding is conducted; and
    a surface treated section, provided on each of the pair of side edges, which is subjected to surface treatment in a coarse surface to have a coarser surface roughness than a surface roughness of a partitioning section by which an intake port is partitioned.

14. The partition plate according to claim 13, wherein the surface treatment is carried out while masking the partitioning section with a masking material or a sand core.

15. The partition plate according to claim 13, further comprising a promoter section provided on each of the pair of side edges to promote solidification of the molten metal, wherein the promoter section is treated in a coarse surface to have a coarser surface roughness than the surface roughness of the partitioning section.

16. A cylinder head adapted to be manufactured by cast molding, comprising:
    a cylinder bore;
    an intake port connected to the cylinder bore; and
    a partition plate that is preliminarily set, prior to cast molding, in a sand core applied to form the intake port and then cast in when the cast molding is conducted so as to partition the intake port into a plurality of ports, the partition plate being provided with:
    an intake-side distal end;
    a cylinder-side distal end;
    a pair of side edges continuous with the intake-side distal end and the cylinder-side distal end and to be cast in by molten metal when cast molding is conducted; and
    a surface treated section, provided on each of the pair of side edges, which is subjected to surface treatment in a coarse surface to have a coarser surface roughness than a surface roughness of a partitioning section by which the intake port is partitioned.

17. A method of manufacturing a cylinder head having a partition plate for an intake port, comprising:
    preparing a partition plate including an intake-side distal end, a cylinder-side distal end, a pair of side edges continuous with the intake-side distal end and the cylinder-side distal end and to be cast in by molten metal when cast molding is conducted, and a surface treated section provided on each of the pair of side edges and subjected to surface treatment in a coarse surface to have a coarser surface roughness than a surface roughness of a partitioning section by which an intake port is partitioned;
    setting the partition plate in a sand core to form the intake port such that each of the pair of side edges is exposed outside;
    supplying molten metal onto each of the pair of side edges of the partition plate;
    solidifying the molten metal while causing the surface treated section to be cast in; and
    removing the sand core.

18. A partition plate, for an intake port of a cylinder head to be manufactured by cast molding, which is preliminarily set prior to the cast molding in a sand core applied to form the intake port and then cast in when the cast molding is conducted so as to partition the intake port into a plurality of ports, comprising:
    an intake-side distal end;
    a cylinder-side distal end;
    a pair of side edges continuous with the intake-side distal end and the cylinder-side distal end and to be cast in by molten metal when cast molding is conducted, each of the pair of side edges having end faces facing in a thickness direction and a side end face continuous with the end faces; and
    a promoter section including at least one indentation provided on at least one of the side end face and the end faces of each of the pair of side edges to promote solidification of the molten metal.

19. A cylinder head adapted to be manufactured by cast molding, comprising:
    a cylinder bore;
    an intake port connected to the cylinder bore; and
    a partition plate that is preliminarily set, prior to cast molding, in a sand core applied to form the intake port and then cast in when the cast molding is conducted so as to partition the intake port into a plurality of ports, the partition plate being provided with:
    an intake-side distal end;
    a cylinder-side distal end;
    a pair of side edges continuous with the intake-side distal end and the cylinder-sided distal end and to be cast in by molten metal when cast molding is conducted, each of the pair of side edges having end faces facing in a thickness direction and a side end face continuous with the end faces; and
    a promoter section including at least one indentation provided on at least one of the side end face and the end faces of each of the pair of side edges to promote solidification of the molten metal.

20. A method of manufacturing a cylinder head having a partition plate for an intake port, comprising:
    preparing a partition plate including an intake-side distal end, a cylinder-side distal end, a pair of side edges continuous with the intake-side distal end and the cylinder-side distal end to be cast in by molten metal when cast molding is conducted, and a promoter section including at least one indentation provided on at least one of end faces, facing in a thickness direction, and a side end face, continuous with the end faces, of each of the pair of side edges to promote solidification of the molten metal;
    setting the partition plate in a sand core applied to form an intake port such that each of the pair of side edges is exposed outside;
    supplying molten metal onto each of the pair of side edges of the partition plate;
    solidifying the molten metal while promoting the solidification of the molten metal with the promoter section; and
    removing the sand core.

21. A partition plate, for an intake port of a cylinder head to be manufactured by cast molding, which is preliminarily set prior to the cast molding in a sand core applied to form the intake port and then cast in when the cast molding is conducted so as to partition the intake port into a plurality of ports, comprising:
    an intake-side distal end;
    a cylinder-side distal end;
    a pair of side edges continuous with the intake-side distal end and the cylinder-side distal end and to be cast in by molten metal when cast molding is conducted, each of the pair of side edges having end faces facing in a thickness direction and a side end face continuous with the end faces; and
    a promoter section provided on at least one of the side end face and the end faces of each of the pair of side edges to be closer to the cylinder-side distal end than the intake-side distal end so as to promote solidification of the molten metal.

22. A cylinder head adapted to be manufactured by cast molding, comprising:

a cylinder bore;

an intake port connected to the cylinder bore; and a partition plate that is preliminarily set, prior to cast molding, in a sand core applied to form the intake port and then cast in when the cast molding is conducted so as to partition the intake port into a plurality of ports, the partition plate being provided with:

an intake-side distal end;

a cylinder-side distal end;

a pair of side edges continuous with the intake-side distal end and the cylinder-side distal end and to be cast in by molten metal when cast molding is conducted, each of the pair of side edges having end faces facing in a thickness direction and a side end face continuous with the end faces; and a promoter section provided on at least one of the side end face and the end faces of each of the pair of side edges to be closer to the cylinder-side distal end than the intake-side distal end so as to promote solidification of the molten metal.

23. A method of manufacturing a cylinder head having a partition plate for an intake port, comprising:

preparing a partition plate including an intake-side distal end, a cylinder-side distal end, a pair of side edges continuous with the intake-side distal end and the cylinder-side distal end to be cast in by molten metal when cast molding is conducted, and a promoter section provided on at least one of end faces, facing in a thickness direction, and a side end face, continuous with the end faces, of each of the pair of side edges to promote solidification of the molten metal, wherein the promoter section is closer to a cylinder-side distal end of the partition plate than an intake-side distal end of the partition plate;

setting the partition plate in a sand core applied to form an intake port such that each of the pair of side edges is exposed outside;

supplying molten metal onto each of the pair of side edges of the partition plate;

solidifying the molten metal while promoting the solidification of the molten metal with the promoter section; and removing the sand core.

* * * * *